US008949012B2

(12) United States Patent
Rabbath et al.

(10) Patent No.: US 8,949,012 B2
(45) Date of Patent: Feb. 3, 2015

(54) AUTOMATED MULTI-VEHICLE POSITION, ORIENTATION AND IDENTIFICATION SYSTEM AND METHOD

(75) Inventors: Camille-Alain Rabbath, L'Ancienne-Lorette (CA); Alexandre Morris, Quebec (CA); Dominic Grenier, Quebec (CA)

(73) Assignee: Her Majesty the Queen in Right of Canada, as represented by the Minister of National Defence, Ottawa, Ontario (CA)

( * ) Notice: Subject to any disclaimer, the term of this patent is extended or adjusted under 35 U.S.C. 154(b) by 0 days.

(21) Appl. No.: 13/440,357

(22) Filed: Apr. 5, 2012

(65) Prior Publication Data

US 2013/0268185 A1 Oct. 10, 2013

(51) Int. Cl.
 *G05D 1/02* (2006.01)
 *G06F 17/10* (2006.01)
 *G06G 7/78* (2006.01)

(52) U.S. Cl.
 CPC .............. *G05D 1/021* (2013.01); *G05D 1/0257* (2013.01); *G05D 1/0255* (2013.01); *G05D 1/0295* (2013.01)
 USPC .......................................... 701/300; 701/408

(58) Field of Classification Search
 CPC ... G05D 1/021; G05D 1/0255; G05D 1/0257; G05D 1/0295
 USPC ...................... 701/300, 408; 342/118; 367/99
 See application file for complete search history.

(56) References Cited

U.S. PATENT DOCUMENTS

| | | | |
|---|---|---|---|
| 5,570,099 A | 10/1996 | DesJardins | |
| 6,087,987 A | 7/2000 | Bachuber et al. | |
| 6,512,978 B2* | 1/2003 | Suzuki | 701/525 |
| 6,906,661 B2* | 6/2005 | Sawamoto et al. | 342/70 |
| 7,062,381 B1* | 6/2006 | Rekow et al. | 701/300 |
| 7,649,808 B2* | 1/2010 | Oura et al. | 367/128 |
| 7,876,266 B2 | 1/2011 | Rhaods | |
| 7,948,426 B2 | 5/2011 | Pevler et al. | |
| 8,503,265 B2* | 8/2013 | Akiyama et al. | 367/93 |
| 8,666,656 B2* | 3/2014 | Mikami et al. | 701/428 |
| 2002/0017415 A1* | 2/2002 | Campbell et al. | 180/271 |
| 2005/0035897 A1 | 2/2005 | Perl | |
| 2006/0221769 A1* | 10/2006 | Van Loenen et al. | 367/99 |
| 2008/0037512 A1 | 2/2008 | Aljadeff | |
| 2008/0186231 A1 | 8/2008 | Aljadeff et al. | |
| 2009/0073045 A1 | 3/2009 | Supino | |
| 2010/0066517 A1* | 3/2010 | Posselius et al. | 340/435 |

* cited by examiner

*Primary Examiner* — Calvin Cheung
*Assistant Examiner* — Paula L. Schneider
(74) *Attorney, Agent, or Firm* — Brion Raffoul

(57) ABSTRACT

The present invention provides a system and method for relative localization that provides an orientation signal and a position signal between at least two vehicles. The present invention also provides for vehicle formation, such that there is a leading vehicle and a follower vehicle that maintain a specific formation relative to one another. The orientation, relative position and identity signals are utilized to control that formation. Each vehicle has at least three ultrasonic sensors, at least one ultrasonic source and an optional pair of FM receiver/transmitter. By installing several acoustic sensors whose relative position are known and by measuring the difference in the time of arrival of the same signal from the various sensors on the same vehicle, the difference in time can be converted into a difference of distance and then into relative position of the sensors from the source based on the Time Difference of Arrival (TDOA).

14 Claims, 19 Drawing Sheets

AUTOMATED MULTI-VEHICLE POSITION, ORIENTATION AND IDENTIFICATION SYSTEM AND METHOD

TECHNICAL FIELD

The present invention relates to automated, multi-vehicle relative position and orientation, vehicle identification systems and digital signal processing.

BACKGROUND

The prior art includes a number of partial and complete solutions to the problem of controlling and guiding unmanned vehicles. Many prior art systems use the following systems, individually or in combination, to determine the angle and relative position between a group of unmanned vehicles: a global positioning system (GPS); utilizing wireless signals and various algorithms to calculate the relative position of the vehicles; laser range finders (LRF); systems using cameras; sound navigation or ranging (SONAR) systems; and radio detection and ranging (RADAR) systems.

However, the aforementioned solutions have a number of drawbacks. Firstly, the GPS system does not function efficiently in urban zones or between buildings. Secondly, the SONAR and LRF systems that are mounted on unmanned vehicles can assist by determining the distance between vehicles and objects within the vehicle's line of sight However, these systems are not capable of specifically identifying objects. Therefore, it is impossible to determine whether the measured distance is the distance to another vehicle or an unknown object. Thirdly, there are no commercially available camera systems that can be mounted aboard unmanned vehicles and that can assist with locating and identifying a neighbouring vehicle in real time.

As such, there is a need for a system that is capable of relative localization between at least two manned or unmanned vehicles in real-time or near real-time.

SUMMARY

The present invention seeks to provide an automated multi-vehicle position, orientation and identification system and method. More specifically, the present invention provides a system and method for relative localization that provides an orientation signal and a position signal between at least two vehicles. The present invention also provides for vehicle formation, such that there is a leading vehicle and a follower vehicle that maintain a specific formation relative to one another. The orientation, the relative position and the identification signals are utilized to form and maintain that formation.

Each vehicle has at least four ultrasonic sensors and at least one ultrasonic source. The vehicle localization system is based on the assumption that sound waves travel at a specific speed. By installing several acoustic sensors whose relative position are known and by measuring the difference between the time of arrival of the same signal from the various sensors on the same vehicle, the difference in time can be converted into the relative position of the sensors from the source based on the well-known concept of Time Difference of Arrival (TDOA).

The present invention only requires vehicle's on-board available information to ensure that the vehicle formation is maintained. Measurements are also taken in real-time and the location of several vehicles can be determined at once. The present invention has particular application for unmanned vehicles, mobile robots, and small aerial vehicles.

Advantageously, the system is small, of low-cost and requires limited energy consumption.

In a first aspect, the present invention provides a system for locating a first vehicle relative to a second vehicle comprising: at least one ultrasonic source, operatively coupled to the first vehicle, for transmitting a signal; at least four sensors, operatively coupled to the second vehicle for receiving the signal; and signal processing means, operatively coupled to the second vehicle, for processing the signal received by each of the at least four sensors to determine the relative location of the second vehicle to the first vehicle based on differences in time of arrival of the same signal by each of the at least four sensors.

In a second aspect, the present invention provides a method for locating a first vehicle relative to a second vehicle comprising steps of: (a) from a source operatively coupled to a first vehicle, transmitting a signal; (b) to at least four sensors operatively coupled to a second vehicle, receiving the signal; (c) processing the signal received by each of the at least four sensors; and (d) determining the relative location of the second vehicle to the first vehicle based on differences in time of arrival of the same signal by each of the at least four sensors.

In a third aspect, the present invention provides system for locating a first vehicle relative to a second vehicle comprising: at least one source, operatively coupled to the first vehicle, for transmitting a source signal; at least three sensors, operatively coupled to the second vehicle for receiving the source signal; and signal processing means, operatively coupled to the second vehicle; a RF receiver operatively coupled to the at least one source; and a RF transmitter, operatively coupled to the signal processing means, for sending a radio frequency (RF) signal to the RF receiver; wherein the signal processing means processes the source signal received by each of the at least three sensors to determine the relative location of the second vehicle to the first vehicle based on differences in time of arrival of the same signal by each of the at least three sensors and based on a round trip time of the RF signal to be received by the RF receiver and for the source signal to be transmitted to the at least three sensors; wherein the at least one source sends the source signal when the RF signal is received by the RF receiver.

In a fourth aspect, the present invention provides method for locating a first vehicle relative to a second vehicle comprising steps of: (a) from at least three sensors operatively coupled to a second vehicle, transmitting a RF signal; (b) to a source operatively coupled to at least one sensor, receiving the RF signal; (c) from the source, transmitting a source signal when the RF signal is received; (d) to at least three sensors operatively coupled to a second vehicle, receiving the source signal; (e) processing the source signal received by each of the at least three sensors; and (f) determining the relative location of the second vehicle to the first vehicle based on differences in time of arrival of the source signal by each of the at least three sensors and based on a round trip time of the RF signal to be received and for the source signal to be transmitted to the at least three sensors.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
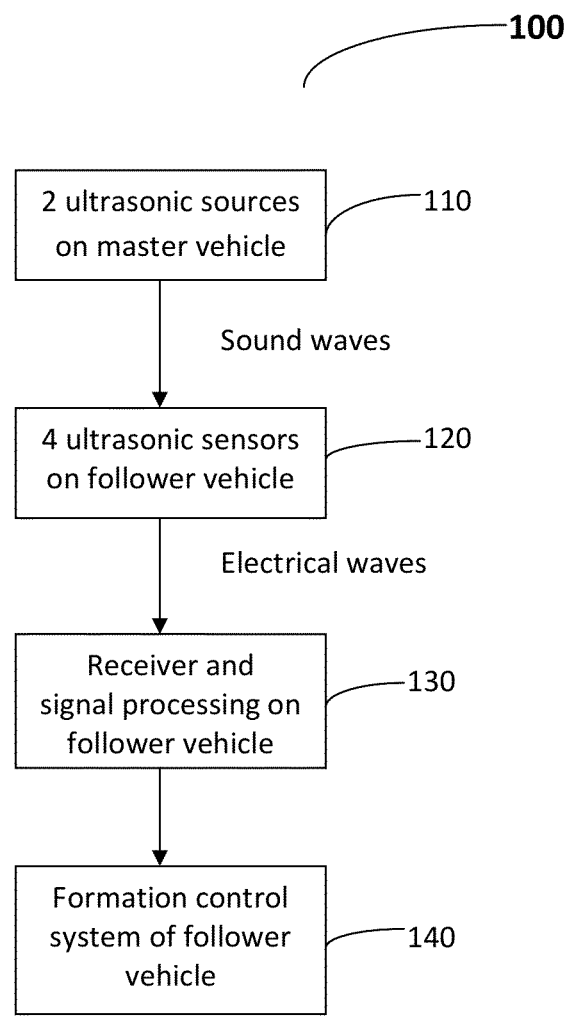
FIG. 1 is a high level block diagram of the system according to an aspect of the present invention.

FIG. 1 is a high level block diagram of the system 100 of the present invention. The system 100 elements shown here are for a formation of two vehicles, including a master and a follower. Multiples vehicles, and therefore further elements, are envisaged by the present invention. The system 100 includes two ultrasonic sources 110 on-board a master vehicle, and four ultrasonic sensors 120 on-board a follower vehicle, receiver and signal processing means 130 on-board the follower vehicle, and a formation control system 140 on-board the follower vehicle.

In accordance with the present invention, the ultrasonic sources 110 transmit sound waves that are received by ultrasonic sensors 120. The receiver and signal processing means 130 processes electrical waves produced by the four ultrasonic sensors 120. Both source signals are separated and the relative orientation and position between the master and follower vehicles is determined. The formation control system 140 then maintains a formation between the master and follower vehicle, such that, for example, the follower maintains a particular orientation and position from the master.

Figure 2:
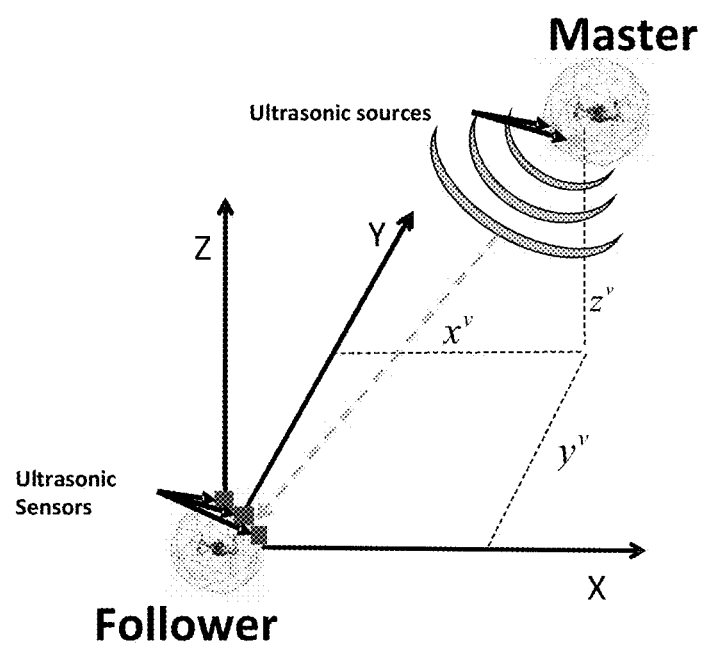
FIG. 2 is a graphical illustration of how the present invention operates according to an aspect of the present invention.

FIG. 2 is a graphical illustration of how the present invention operates. A matrix of ultrasonic sensors is installed on the vehicle identified as the follower. At least four sensors must be present. This matrix collects the signals emitted by two ultrasonic sources located on the vehicle in the formation identified as the master on FIG. 2.

It should be noted that the master vehicle must be in the line of sight of the follower for the purposes of the present invention. In addition, the minimum number of ultrasonic sensors required per vehicle is four. The minimum number of sources required per vehicle is two if relative heading is needed for formation control and one source per vehicle if only relative position is required.

Figure 3:
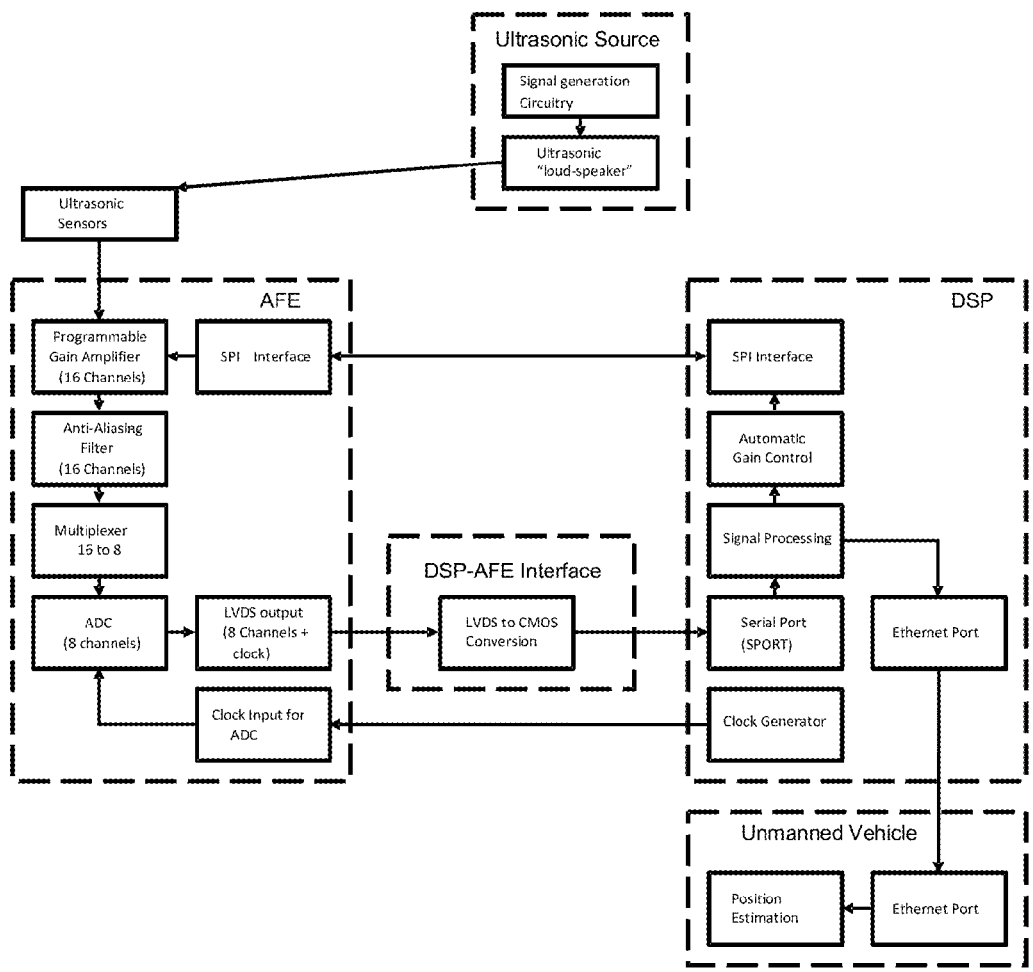
FIG. 3 is a system diagram showing the interconnections between the various components of the present invention for an unmanned vehicle according to an aspect of the present invention.

As shown in FIG. 3, the signals collected by the matrix of sensors are digitized with an AFE (Analog Front End). These digitized signals are subsequently processed by a DSP (Digital Signal Processor) to determine the time difference of arrival (TDOA). Thereafter, the position of the sources is estimated with the TDOA measurements.

The sources emit a particular waveform that provides an estimate of the time of arrival of the signals. These sources will emit pure sinusoidal waves during a short period of time and then do not emit anything for a relatively large period of time (as shown on FIG. 7). The time of arrival of the signal thus corresponds to the moment when the sinusoidal wave is detected.

Referring again to FIG. 2, each source emits a sinusoidal wave at an Eigen frequency that is distinct from the other.

FIG. 3 is a system diagram showing the interconnections between the various components of the present invention for an unmanned vehicle in accordance with the present invention. According to the present invention, the received signals are processed through a band pass filter in order to separate each source. For example, the filters utilized are finite impulse response (FIR) filters with constant delay and N=33 points and a numerical bandwidth of 0.02. Each filter introduces the same delay. The signal processing allows the present invention to identify a neighbouring vehicle (that has sources operating at Eigen frequencies distinct from those coming from the other vehicles) and to treat the signals emanating from each source independently of the other source(s), to determine the relative position and the orientation between two vehicles.

The localization system is based on the assumption that sound waves travel at a fixed speed in the air, i.e., 343 m/s under normal ambient conditions. It is thus possible to install several acoustic sensors whose relative position is known by measuring the difference in the time of arrival of the same signal to the various sensors (by relying on the well-known concept of TDOA). This difference in time can thereafter be converted into a difference in distance that is then converted in relative positions in accordance with the present invention.

On each vehicle, at least four ultrasonic sensors will receive sound waves. The AFE then converts the analog signal from the ultrasonic sensors into a digital signal. The DSP is also provided with a multitude of inputs and outputs to exchange data with several peripherals. The DSP applies digital filters to the data received from the AFE and estimates the time of arrival of the signals. As the AFE cannot directly send the digital data to the DSP, because the electrical signals produced by the AFE are not compatible with the entries of the DSP, a DSP-AFE interface circuit is utilized, as shown in FIG. 3.

Referring again to FIG. 3, the unmanned vehicle is identified as Robot, LVDS refers low voltage differential signalling, CMOS refers to complementary metal-oxide-semiconductor, and SPI is a serial peripheral interface.

Figure 4:
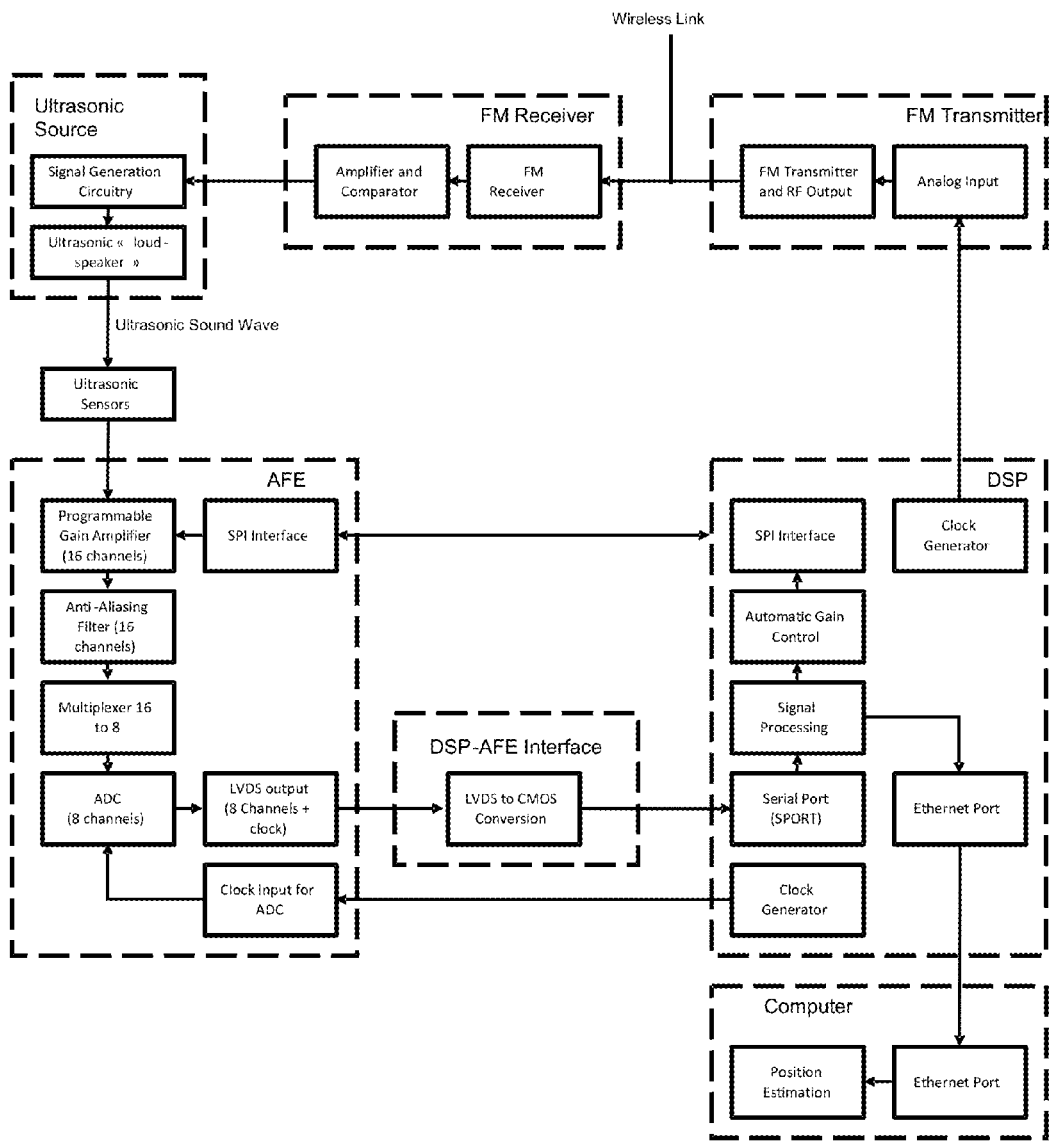
FIG. 4 is a system diagram showing interconnections between various components including a hardware modification for estimating the distance between the source and the sensors for an unmanned vehicle according to an aspect of the present invention.

Referring now to FIG. 4, the present invention also provides for radio frequency (RF) synchronization. In another aspect of the present invention, the system includes a wireless link between the DSP and ultrasonic sources. This modification allows the system to estimate the distance between sources and sensors with more precision than the system of the present invention shown in FIG. 3.

Figure 5:
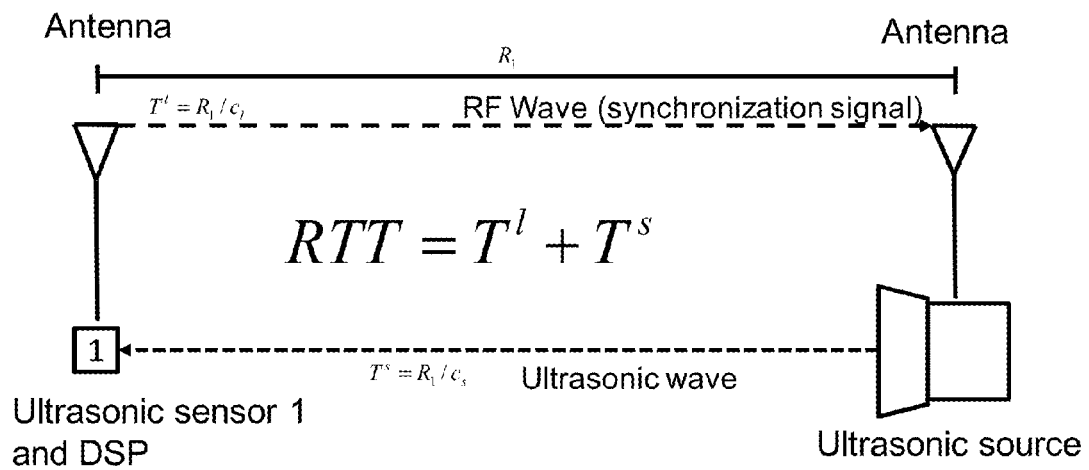
FIG. 5 is a system diagram showing the interconnections of various components utilized to calculate the round trip time (RTT) and to estimate the distance between two vehicles according to an aspect of the present invention.
Figure 7:
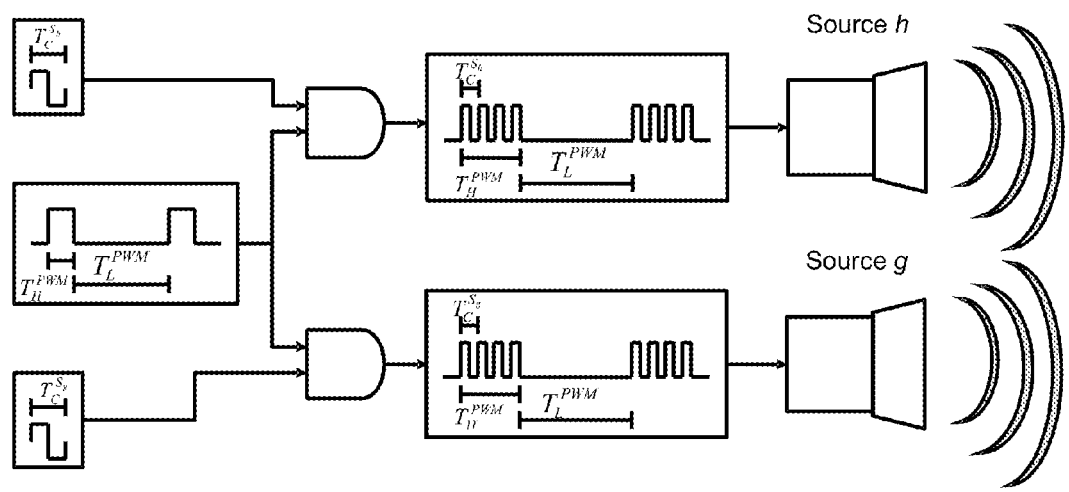
FIG. 7 is a schematic diagram of the circuit for generating ultrasonic waves according to an aspect of the present invention.

FIG. 5 is a diagram that illustrates how the round trip time (RTT) is calculated. The RTT is the time taken for the synchronization signal to travel from the DSP to the ultrasonic source using an RF link and back to the ultrasonic sensor via the sound wave. This measurement is used to determine the distance between sources and sensors with high precision, thus increasing the overall precision of the system. It should be noted that the RF synchronization signal is received by a frequency modulation (FM) receiver and is sent to the ultrasonic wave generation circuit. This signal controls the PWM wave period ($T^{PWM}$) and when the rise of the PWM signal occurs. The PWM signal is illustrated at FIG. 7.

It should be noted that a FM receiver and transmitter can be added to the system in order to increase the precision of the system. As shown in FIGS. 4 and 5, it is possible to calculate the time for the ultrasonic sound wave to travel from the source to the sensor 1 (also known as the propagation delay). The propagation delay is then used to estimate the source's distance from the sensor 1.

Figure 6:
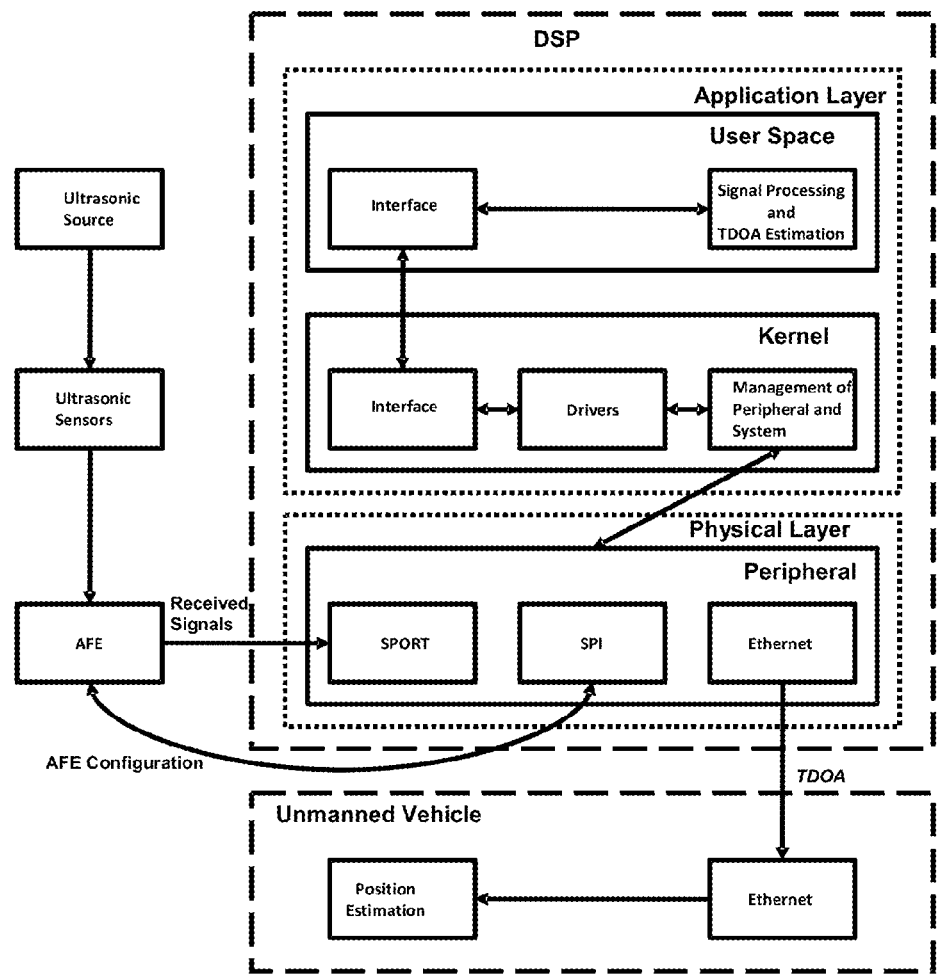
FIG. 6 shows the software architecture and the interaction between the user space, the kernel and the peripherals of the digital signal processor (DSP) according to an aspect of the present invention.

FIG. 6 shows the software architecture and the interaction between the user space, the kernel and the peripherals of the DSP in accordance with the present invention. According to the present invention, the DSP operates under an operating system (OS). For exemplary purposes, it operates Linux for embedded processors (uClinux). The architecture of this OS is very similar to the architecture of Linux. Operations as well as the management of peripherals are carried out in the kernel by the drivers.

Referring to FIG. 6, the kernel and the user space can communicate via an input/output control (IOCTL) interface. The kernel receives data from the Serial Port (SPORT) for processing. Then, the kernel requires the driver to begin operating. The received data are sent for signal processing via the interface. The DSP also communicates through the SPI to configure registers of the AFE, as well as the Ethernet port to send TDOA measurements to the unmanned vehicle. The unmanned vehicle has processing capability to then estimate the position of the sources based on the TDOA measurements.

The sound waves are composed of a carrier wave modulated by a Pulse Width Modulation (PWM) signal. Each sound wave has been chosen because it enables the estimation of TDOA measurements. The PWM signal is common to each source located on the same vehicle, yet the carrier wave for each source uses an Eigen frequency.

As mentioned previously, at least two sources are required to estimate the relative orientation between two vehicles. However, it should be mentioned that the present invention may estimate the relative position between two vehicles with only one source. As shown on FIG. 12, the vehicle 2 at position A and position B are different only in terms of relative heading, yet the relative position is still the same according to vehicle 2's coordinate system. Position A and position B could not be differentiated if vehicle 1 had only one source (located at the V point), but the position of vehicle 1 would still be known in relation to vehicle 2. With two sources, position A and position B may be differentiated because the system can estimate the relative heading.

FIG. 7 is a schematic diagram of the circuit for generating ultrasonic waves from the two ultrasonic sources denoted as source h and source g, where $T_c^{sh}$ is the carrier period of the source h, $T_H^{PWM}$ the wave high period and $T_L^{PWM}$ is the wave low period of the PWM wave. The period of the PWM wave is $T^{PWM} = T_L^{PWM} + T_H^{PWM}$.

The process for determining the TDOA is carried out periodically, at a fixed rate. The process detects the time of arrival of the ultrasonic waves at two different times from the signal received by the first sensor. Specifically, the process determines two point of detection. The process then estimates the PWM wave period $T^{PWM}$, which is the delay between the two peaks, and the time of arrival of the first peak for the signals received by all of the ultrasonic sensors. With the time of the first peak of all channels and the PWM wave period, the present invention determines points of detections for all channels. These points represent intervals in which the signal power is at its maximum, i.e., where a peak occurs. Inside these intervals, the present invention searches for the sample corresponding to the time of arrival of the signal received by each sensor within intervals centered around points of detection. This technique saves computation time to find the sample corresponding to the time of arrival while keeping the accuracy of one sample period.

Figure 8:
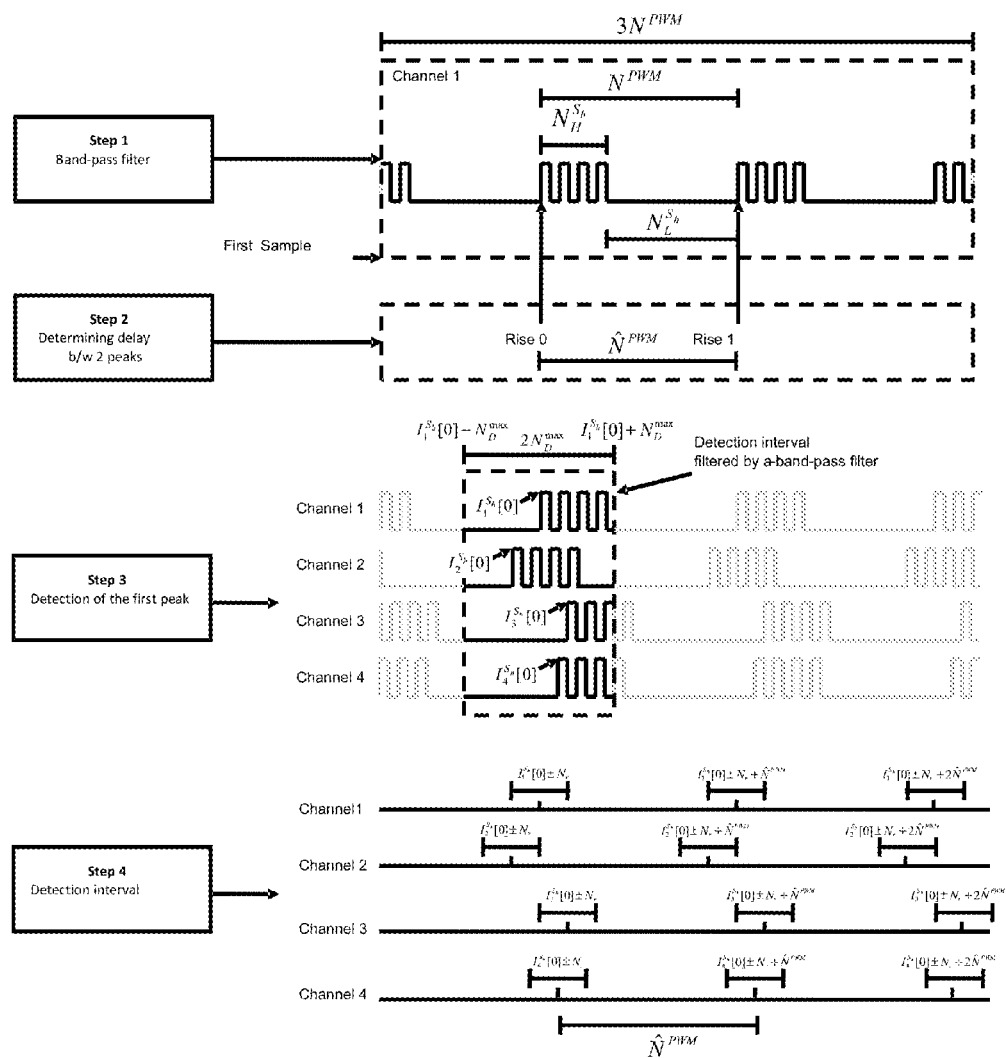
FIG. 8 is a schematic diagram of four steps involved in the calculation of time difference of arrival based on the generation of multiple detection points exploiting the known wave form according to an aspect of the present invention.

FIG. 8 is a schematic diagram of four steps—Step 1, Step 2, Step 3, and Step 4—involved in the calculation of the time difference of arrival based on the generation of multiple detection points. Step 1 consists of applying a band-pass filter to isolate the desired source. In this particular embodiment, the band-pass filter is an FIR filter with a constant delay having N=33 points and a numerical bandwidth of 0.02. The filter is applied to signals received by each of the four ultrasonic sensors. Here, the number of filtered samples corresponds to three times the period of the PWM wave (to estimate the period of the PWM wave). However, the above parameters for sampling and number of sensors may vary in accordance with the present invention.

Referring again to FIG. 8, step 2 determines the delay between the two peaks based on the filtered data from step 1, so as to find the sample corresponding to the time of arrival for a specific sensor. In other words, the process must determine the specific sample where the first instance of the sinusoidal wave is detected.

Following that, step 3 consists of detecting the first instance of a sinusoidal wave received by all of the sensors on Channels 1, 2, 3, and 4. At step 3, the data is filtered by the same band-pass filter as used in step 1 before the sinusoidal wave detection occurs.

Step 4 calculates the points of detections. A point of detections represents a series of samples in for which a peak has occurred. To estimate the time of arrival of the signal, the process seeks out the time when the signal power peaks within intervals around points of detections. When working with digitized signals, the time can be converted into samples. For instance, the period of the PWM wave $T^{PWM}$ thus corresponds to a number of samples $N^{PWM}$. The PWM wave becomes a number of high and low samples noted as $N_H^{PWM}$ and $N_L^{PWM}$. The sample where a rise K is detected for the source h (shown in FIG. 7) with sensor i noted as $I_i^{Sh}[k]$.

At step 3, the peak time of one of the sensors allows searching within a smaller area where the first peak in the signal received by other sensors. This search interval is delimited by the distance between sensors. It should be noted that the difference in distance between the source and the sensors cannot be larger than the distance between the sensors. Therefore, the detection interval will include twice the number of samples corresponding to the maximum distance between two sensors. The number of samples representing the maximum distance is given by following equation:

$$N_D^{max} = \max_{i=\{1 \ldots M\}, j=\{i \ldots M\}} \frac{(D_{i,j})}{C_s T_s} \quad (1)$$

where M is the number of sensors used, $D_{i,j}$ is the distance between sensor i and sensor j, $C_s$ is the propagation velocity of the wave (for ultrasounds in air under normal ambient conditions, $C_s$=343 m/s) and $T_s$ is the sampling period of the signals ($T_s$=2.4 μs for the developed system).

In FIG. 8, the detection interval of the first peak is centered on the rise of sensor 1. Indeed, at step 2, the samples of the first two peaks are estimated. The detection of the first peak for each sensor is determined for $N_D^{max}$ samples before and after the first peak is estimated at channel 1 $I_1^{Sh}[0]$.

At FIG. 8, the detection intervals for step 4 are centered on samples of the first peak at channel i. The number of interval detection samples $2N_r$ is determined experimentally. Yet, $N_r$ must be sufficiently large so that the peaks are well within the detection intervals to accommodate for measurements errors. The detection interval is duplicated thereafter periodically.

Figure 9:
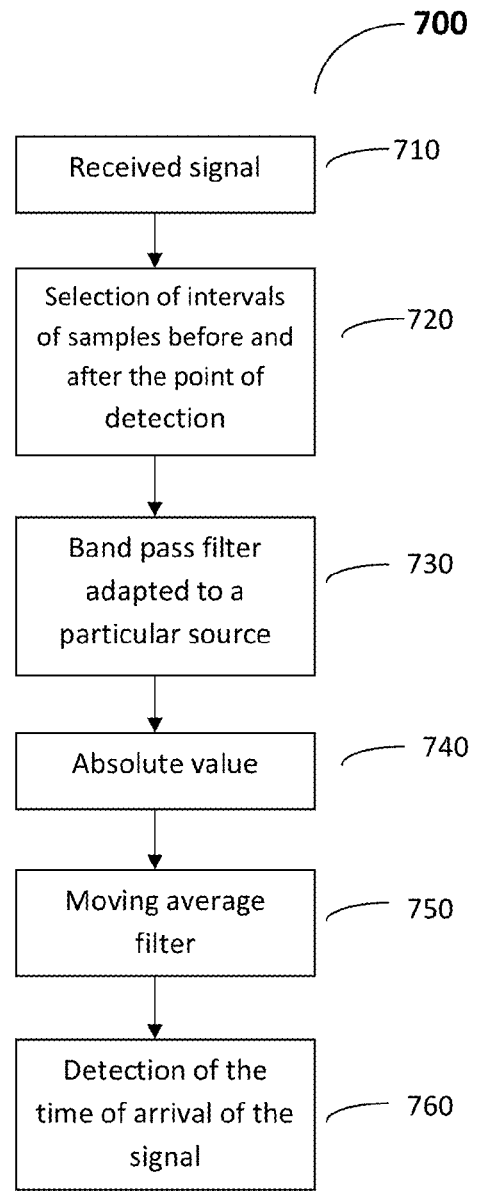
FIG. 9 is a flowchart showing the process 700 applied to the data within the detection intervals for estimating the sample corresponding to each signal peak obtained by each sensor according to an aspect of the present invention.

FIG. 9 is a flowchart showing the process 700 applied to the data detected within the detection intervals for estimating the sample corresponding to each signal peak obtained by each sensor. According to the process 700, step 710 involves receiving the signal at a particular sensor. Following that, Step 720 selects the intervals of samples before and after the point of detection. Next, step 730 selects a particular source for band-pass filtration. Following that, step 740 determines the absolute value for the filtered signal, and then in step 750 a moving average is obtained to determine the signal envelope for the particular source selected. Finally, step 760 determines the time of arrival of the signal to complete the process.

Figure 10:
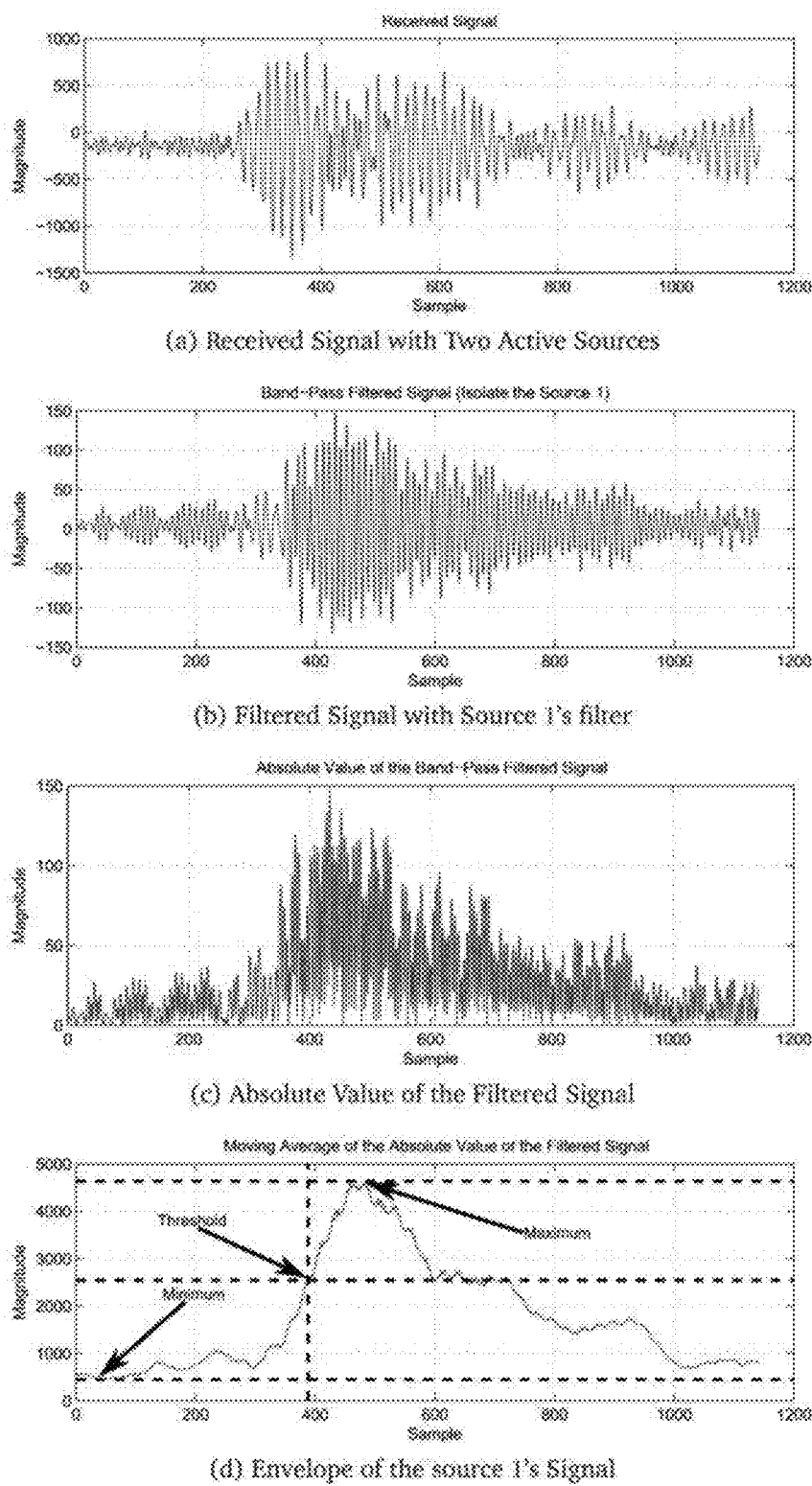
FIGS. 10A, 10B, 10C, and 10D are graphical representations of the process for determining the time of arrival of the signal of one of two active sources based on the experimental data received by one ultrasonic sensor in accordance with an aspect of the present invention.

FIGS. 10A, 10B, 10C, and 10D are graphical representations of the process for determining the time of arrival of the signal for one of two active sources based on the experimental data received. The first source operates at 40 KHz, and the second source operates at 25 KHz. The high and the low times of the PWM wave are $T_H^{PWM}$=198.2 μs and $T_L^{PWM}$=7.8 ms, respectively. As shown in FIG. 10B, the data is filtered by the band-pass filter in order to select the desired source. As shown in FIG. 10C, the absolute value is then calculated based on the filtered data so as to maintain the signal amplitude. A moving average filter (of 30 points in this example) is then applied to calculate the signal envelope as shown in FIG. 10D. The envelope is then used to determine the sample corresponding to the time of arrival of the signal.

For further clarity, FIG. 10A relates to Step 710, in FIG. 9. FIG. 10B relates to step 730 in FIG. 9. FIG. 10C relates to step 740 in FIG. 9. And FIG. 10D relates to step 750 in FIG. 9.

With reference to FIG. 10D, to determine the sample corresponding to the peak time from the signal envelope, the process initially detects the minimum and the maximum ($A_{min}$ and $A_{max}$) of the envelope. A decision threshold $A_{threshold}$ is calculated based on the below equation (2). The process seeks the sample thereafter where the amplitude of the envelope is closer to the threshold, and yet located between the minimum and maximum. This sample corresponds to the time of arrival of the signal.

$$A_{threshold} = \frac{A_{min} + A_{max}}{2} \quad (2)$$

As mentioned previously, a vehicle includes two sources: source 1 and source 2. The position of source 1 in Cartesian space is noted as $x^{s1}$, $y^{s1}$ and $z^{s1}$ and that of the source 2 is noted as $x^{s2}$, $y^{s2}$ and $z^{s2}$. The distance between the source h and the sensor i is noted $r_i^{sh}$.

Based on equation (2) and by assuming that the sensors are in the plan x=0 and that the first sensor is located at the origin of the frame of reference, the error value of the position of the two sources is as follows:

$$\underline{\varepsilon}_{i_1} = \hat{\underline{G}}_{i_1}[k]\hat{\underline{z}}_{i_1}[k] + \hat{\underline{h}}_{i_1}[k] \quad (3)$$

where $$\hat{\underline{G}}_{i_1}[k] = \begin{bmatrix} -2y_{2,1} & -2z_{2,1} & -2\hat{r}_{2,1}^{s1}[k] & 0 & 0 & 0 \\ -2y_{3,1} & -2z_{3,1} & -2\hat{r}_{3,1}^{s1}[k] & 0 & 0 & 0 \\ -2y_{4,1} & -2z_{4,1} & -2\hat{r}_{4,1}^{s1}[k] & 0 & 0 & 0 \\ 0 & 0 & 0 & -2y_{2,1} & -2z_{2,1} & -2\hat{r}_{2,1}^{s2}[k] \\ 0 & 0 & 0 & -2y_{3,1} & -2z_{3,1} & -2\hat{r}_{3,1}^{s2}[k] \\ 0 & 0 & 0 & -2y_{4,1} & -2z_{4,1} & -2\hat{r}_{4,1}^{s2}[k] \end{bmatrix} \quad (4)$$

$$\hat{\underline{h}}_{i_1}[k] = \begin{bmatrix} (K_2 - K_1) - (\hat{r}_{2,1}^{s1}[k])^2 \\ (K_3 - K_1) - (\hat{r}_{3,1}^{s1}[k])^2 \\ (K_4 - K_1) - (\hat{r}_{4,1}^{s1}[k])^2 \\ (K_2 - K_1) - (\hat{r}_{2,1}^{s2}[k])^2 \\ (K_3 - K_1) - (\hat{r}_{3,1}^{s2}[k])^2 \\ (K_4 - K_1) - (\hat{r}_{4,1}^{s2}[k])^2 \end{bmatrix} \quad (5)$$

$$\hat{\underline{z}}_{i_1}[k] = \begin{bmatrix} \hat{y}^{s1}[k] \\ \hat{z}^{s1}[k] \\ \hat{r}_1^{s1}[k] \\ \hat{y}^{s2}[k] \\ \hat{z}^{s2}[k] \\ \hat{r}_1^{s2}[k] \end{bmatrix} \quad (6)$$

where $\underline{\varepsilon}_{i_1}$ is the error value for the intermediate method 1, $y_{j,i}$ and $z_{j,i}$ represent the difference in distance between the sensors j and i in the y and z axis respectively. The difference in distance is estimated by comparing the source h to sensor i and j at time k noted as $\hat{r}_{j,i}^{sh}[k]$. The squared distance between sensor i and the origin of the axis system is noted as $K_i$.

As detailed below, the final method (method f) will be composed of intermediate methods 1 through 4. The intermediate method 1 is the method that estimates the relative position of both sources independently, the intermediate method 2 exploits the fact that both sources share the same PWM signal, the intermediate method 3 exploits the fact that the distance between both sources is known. This provides an increased precision on the relative position and the relative orientation. Furthermore, the intermediate method 4 applies a low-pass filter on the estimated position in order to reduce the output's variation caused by measurement noise.

The equation (3) provides the estimated error vector of the intermediate method 1. As detailed below, the error vector of the method f will be composed of intermediate error vectors. The method f error vector will then be used to estimate the relative position and orientation by minimizing the squared sum of the error vector components.

Since two sources are mounted on the same vehicle, it is possible to modify the original process to include extra information provided by the system. Indeed, when the sources emit signals at the same time, the information regarding the distance between the two sources and the same vehicle's sensors can be utilized. The difference in distance between the sources 1 and 2 with respect to a particular sensor will be noted as:

$$r_i^{s2-s1} = r_i^{s2} - r_i^{s1} \quad (7)$$

The equation (7) can be included directly in the linear equations system (3) for i=1. This additional information is very advantageous because it provides extra information to the system. However, equation (7) cannot be formulated directly with i≠1. To include measurements for the differences in time between the detection of the signals, emitted by the two sources, by the other sensors, it is necessary to reformulate equation (7). The equation that provides the distance of a source relative to the sensor i of the system is now formulated as:

$$(x^{s1} - x_i)^2 + (y^{s1} - y_i)^2 + (z^{s1} - z_i)^2 = (r_i^{s1})^2 \quad (8)$$

where the position of each sensor in the Cartesian frame of reference is noted as $x_i$, $y_i$ and $z_i$. By substituting equation (7) with equation (8), the following equation is produced:

$$(x^{s2} - x_i)^2 + (y^{s2} - y_i)^2 + (z^{s2} - z_i)^2 = (r_i^{s1} + r_i^{s2-s1})^2 = (r_i^{s1})^2 + (r_i^{s2-s1})^2 + 2 r_i^{s1} r_i^{s2-s1} \quad (9)$$

One can simplify equation (9) to obtain the following equations:

$$(x^{s2} - x_i)^2 + (y^{s2} - y_i)^2 + (z^{s2} - z_i)^2 = \\ (x^{s1} - x_i)^2 + (y^{s1} - y_i)^2 + (z^{s1} - z_i)^2 + (r_i^{s2-s1})^2 + 2 r_i^{s1} r_i^{s2-s1} \quad (10)$$

$$(x^{s2})^2 + (y^{s2})^2 + (z^{s2})^2 = 2 x_i x^{s2} + 2 y_i y^{s2} + 2 z_i z^{s2} + (x^{s1})^2 + (y^{s1})^2 + (z^{s1})^2 - 2 x_i x^{s1} - 2 y_i y^{s1} - 2 z_i z^{s1} + (r_i^{s2-s1})^2 + 2 r_i^{s1} r_i^{s2-s1} \quad (11)$$

To calculate the distance between the two sources $D^{s2-s1}$, the following equation is utilized:

$$(x^{s1} - x^{s2})^2 + (y^{s1} - y^{s2})^2 + (z^{s1} - z^{s2})^2 = (D^{s2-s1})^2 \quad (12)$$

$$(D^{s2-s1})^2 = (x^{s1})^2 + (y^{s1})^2 + (z^{s1})^2 + (x^{s2})^2 + (y^{s2})^2 + (z^{s2})^2 - 2 x^{s1} x^{s2} - 2 y^{s1} y^{s2} - 2 z^{s1} z^{s2} \quad (13)$$

By replacing equation (11) into equation (13), the following equation is produced:

$$(D^{s2-s1})^2 = (x^{s1})^2 + (y^{s1})^2 + (z^{s1})^2 - 2 x^{s1} x^{s2} - 2 y^{s1} y^{s2} - \\ 2 z^{s1} z^{s2} + 2 x_i x^{s2} + 2 y_i y^{s2} + 2 z_i z^{s2} + (x^{s1})^2 + (y^{s1})^2 + \\ (z^{s1})^2 - 2 x_i x^{s1} - 2 y_i y^{s1} - 2 z_i z^{s1} + (r_i^{s2-s1})^2 + 2 r_i^{s1} r_i^{s2-s1} \quad (14)$$

Such that:

$$(D^{s2-s1})^2 = 2(x^{s1})^2 + 2(y^{s1})^2 + 2(z^{s1})^2 - \\ 2 x^{s1} x^{s2} - 2 y^{s1} y^{s2} - 2 z^{s1} z^{s2} + 2 x_i (x^{s2} - x^{s1}) + \\ 2 y_i (y^{s2} - y^{s1}) + 2 z_i (z^{s2} - z^{s1}) + (r_i^{s2-s1})^2 + 2 r_i^{s1} r_i^{s2-s1} \quad (15)$$

By taking equation (15) and setting i=1, and subtracting the same equation with any i value results in:

$$0 = 2 x_{i,1} (x^{s2} - x^{s1}) + 2 y_{i,1} (y^{s2} - y^{s1}) + 2 z_{i,1} (z^{s2} - z^{s1}) + \\ (r_i^{s2-s1})^2 + 2 r_i^{s1} r_i^{s2-s1} - (r_1^{s2-s1})^2 - 2 r_1^{s1} r_1^{s2-s1} \quad (16)$$

And simplified as $$0 = 2 x_{i,1} (x^{s2} - x^{s1}) + 2 y_{i,1} (y^{s2} - y^{s1}) + 2 z_{i,1} (z^{s2} - z^{s1}) + \\ (r_i^{s2-s1})^2 - (r_1^{s2-s1})^2 + 2(r_1^{s1} + r_{i,1}^{s1}) r_i^{s2-s1} - 2 r_1^{s1} r_1^{s2-s1} \quad (17)$$

Leading to the final form of the equation that uses the difference in distance measured between the two sources compared to each sensor.

$$0 = 2 x_{i,1} (x^{s2} - x^{s1}) + 2 y_{i,1} (y^{s2} - y^{s1}) + 2 z_{i,1} (z^{s2} - z^{s1}) + \\ (r_i^{s2-s1})^2 - (r_1^{s2-s1})^2 + 2 r_1^{s1} (r_i^{s2-s1} - r_1^{s2-s1}) + 2 r_{i,1}^{s1} r_i^{s2-s1} \quad (18)$$

It should be noted that equation (18) is linear in relation to the position of sources 1 and 2. It is therefore possible to obtain an error vector similar to the equation (3) that includes the measured difference in distance between the two sources compared to each sensor with i=2,3,4. The equation (7) may also be included with i=1, so as to provide an error vector for the intermediate method 2:

$$\varepsilon_{i_2}[k] = \hat{\underline{G}}_{i_2}[k] \hat{z}_{i_2}[k] + \hat{h}_{i_2}[k] \quad (19)$$

where $$\hat{G}_{i_2}[k] = \begin{bmatrix} 0 & 0 & -1 & 0 & 0 & 1 \\ -2y_{2,1} & -2z_{2,1} & 2(\hat{r}_2^{s2-s1}[k] - \hat{r}_1^{s2-s1}[k]) & 2y_{2,1} & 2z_{2,1} & 0 \\ -2y_{3,1} & -2z_{3,1} & 2(\hat{r}_3^{s2-s1}[k] - \hat{r}_1^{s2-s1}[k]) & 2y_{3,1} & 2z_{3,1} & 0 \\ -2y_{4,1} & -2z_{4,1} & 2(\hat{r}_4^{s2-s1}[k] - \hat{r}_1^{s2-s1}[k]) & 2y_{4,1} & 2z_{4,1} & 0 \end{bmatrix} \quad (20)$$

$$\hat{h}_{i_2}[k] = \begin{bmatrix} -\hat{r}_1^{s2-s1}[k] \\ (\hat{r}_2^{s2-s1}[k])^2 - (\hat{r}_1^{s2-s1}[k])^2 + 2\hat{r}_{2,1}^{s1}[k] \hat{r}_2^{s2-s1}[k] \\ (\hat{r}_3^{s2-s1}[k])^2 - (\hat{r}_1^{s2-s1}[k])^2 + 2\hat{r}_{3,1}^{s1}[k] \hat{r}_3^{s2-s1}[k] \\ (\hat{r}_4^{s2-s1}[k])^2 - (\hat{r}_1^{s2-s1}[k])^2 + 2\hat{r}_{4,1}^{s1}[k] \hat{r}_4^{s2-s1}[k] \end{bmatrix} \quad (21)$$

-continued $$\hat{\underline{z}}_{i_2}[k] = \begin{bmatrix} \hat{y}^{s_1}[k] \\ \hat{z}^{s_1}[k] \\ \hat{r}_1^{s_1}[k] \\ \hat{y}^{s_2}[k] \\ \hat{z}^{s_2}[k] \\ \hat{r}_1^{s_2}[k] \end{bmatrix} \quad (22)$$

To increase the accuracy of the present invention, the distance between the two sources $D^{s_2-s_1}$ can be incorporated into the equations system. However, the expression of the distance between the two sources is not linear. As such, it is possible to resolve the system of equations with weighted least-squares (WLS) using an iterative method for numerical resolution. The current iteration is represented by subscript $(\bullet)_l$. Based on equation (13), the error vector for the intermediate method 3 is given as:

$$\underline{\varepsilon}_{i_3}[k_l] = \hat{\underline{G}}_{i_3}[k_l]\hat{\underline{z}}_{i_3}[k_l] + \hat{\underline{h}}_{i_3}[k_l] \quad (23)$$

where $$\hat{\underline{G}}_{i_3}[k_l] = \begin{bmatrix} -2\hat{y}^{s_2}[k_{l-1}] & -2\hat{z}^{s_2}[k_{l-1}] & \hat{r}_1^{s_1}[k_{l-1}] & 0 & 0 & \hat{r}_1^{s_2}[k_{l-1}] \\ 0 & 0 & \hat{r}_1^{s_1}[k_{l-1}] & -2\hat{y}^{s_1}[k_{l-1}] & -2\hat{z}^{s_1}[k_{l-1}] & \hat{r}_1^{s_2}[k_{l-1}] \end{bmatrix} \quad (24)$$

$$\hat{\underline{h}}_{i_3}[k_l] = \begin{bmatrix} -(D^{s_2-s_1})^2 - 2\hat{x}^{s_1}[k_{l-1}]\hat{x}^{s_2}[k_{l-1}] \\ -(D^{s_2-s_1})^2 - 2\hat{x}^{s_1}[k_{l-1}]\hat{x}^{s_2}[k_{l-1}] \end{bmatrix} \quad (25)$$

$$\hat{\underline{z}}_{i_3}[k_l] = \begin{bmatrix} \hat{y}^{s_1}[k_l] \\ \hat{z}^{s_1}[k_l] \\ \hat{r}_1^{s_1}[k_l] \\ \hat{y}^{s_2}[k_l] \\ \hat{z}^{s_2}[k_l] \\ \hat{r}_1^{s_2}[k_l] \end{bmatrix} \quad (26)$$

Where $\hat{x}^{s_1}[k_l]$, $\hat{y}^{s_1}[k_l]$, $\hat{z}^{s_1}[k_l]$, $\hat{r}_1^{s_1}[k_l]$, $\hat{x}^{s_2}[k_l]$, $\hat{y}^{s_2}[k_l]$, $\hat{z}^{s_2}[k_l]$ and represent the position of sources 1 and 2 for time k in the iteration l. The error vector for the time k at the iteration l is represented by $\underline{\varepsilon}_{i_3}[k_l]$.

It should be mentioned that the equations (24) and (25) use the position of the sources estimated at the preceding iteration. However, when these equations are used for the first iteration l=0, the position estimated at the preceding iteration does not exist. For the first iteration, the position estimated at the last iteration for the previous series of iterations is utilized. In other words:

$$\begin{bmatrix} \hat{y}^{s_1}[k_0] \\ \hat{z}^{s_1}[k_0] \\ \hat{r}_1^{s_1}[k_0] \\ \hat{y}^{s_2}[k_0] \\ \hat{z}^{s_2}[k_0] \\ \hat{r}_1^{s_2}[k_0] \end{bmatrix} = \begin{bmatrix} \hat{y}^{s_1}[(k-1)_N] \\ \hat{z}^{s_1}[(k-1)_N] \\ \hat{r}_1^{s_1}[(k-1)_N] \\ \hat{y}^{s_2}[(k-1)_N] \\ \hat{z}^{s_2}[(k-1)_N] \\ \hat{r}_1^{s_2}[(k-1)_N] \end{bmatrix} \quad (27)$$

Where N is the number of iterations carried out at every instance in time k.

The system of equations can also include the estimated position of the sources at a preceding instance of time k. For that, one assumes that the current predicted position is the position estimated at the preceding instance in time. This assumption can be expressed as follows:

$$\begin{bmatrix} \hat{y}^{s_h}[k_{l-1} \mid (k-1)_N] \\ \hat{z}^{s_h}[k_{l-1} \mid (k-1)_N] \\ \hat{r}_1^{s_h}[k_{l-1} \mid (k-1)_N] \end{bmatrix} = \begin{bmatrix} \hat{y}^{s_h}[(k-1)_N] \\ \hat{z}^{s_h}[(k-1)_N] \\ \hat{r}_1^{s_h}[(k-1)_N] \end{bmatrix} \quad (28)$$

The intermediate error vector is defined as follows:

$$\underline{\varepsilon}_{i_4}[k_l] = \hat{\underline{G}}_{i_4}\hat{\underline{z}}_{i_4}[k] + \hat{\underline{h}}_{i_4}[k_l] \quad (29)$$

where:

$$\underline{G}_{i_4} = \underline{I}_6 \quad (30)$$

where $\underline{I}_M$ is the matrix of size M×M

The system of equations $i_1$ corresponds to the method suggested at equation (3) for two sources. The intermediate method $i_2$ is based on the difference in time of arrival of the signals coming from sources 1 and 2 to the various sensors. The intermediate method $i_3$ is based on the fact that the distance between the two sources is known. The intermediate method $i_4$ utilizes the position found at the preceding instance time for low-pass filtering of a position estimated by the system. Based on the intermediate methods $i_1$, $i_2$, $i_3$ and $i_4$, it is possible to define a method that is based on all of the intermediate equations. The matrix $\hat{\underline{G}}_f[k_l]$, the vector $\hat{\underline{h}}_f[k_l]$ and the vector $\hat{\underline{z}}_f[k_l]$ can be defined as follows:

$$\hat{\underline{G}}_f[k_l] = \begin{bmatrix} \hat{\underline{G}}_{i_1}[k] \\ \hat{\underline{G}}_{i_2}[k] \\ \hat{\underline{G}}_{i_3}[k_l] \\ \underline{G}_{i_4} \end{bmatrix} \quad (33)$$

-continued $$\hat{h}_f[k_l] = -\begin{bmatrix} \hat{h}_{i_1}[k_l] \\ \hat{h}_{i_2}[k_l] \\ \hat{h}_{i_3}[k_l] \\ \hat{h}_{i_4}[k_l] \end{bmatrix} \quad (34)$$

$$\hat{z}_f[k_l] = \begin{bmatrix} \hat{y}^{s_1}[k_l] \\ \hat{z}^{s_1}[k_l] \\ \hat{r}_1^{s_1}[k_l] \\ \hat{y}^{s_2}[k_l] \\ \hat{z}^{s_2}[k_l] \\ \hat{r}_1^{s_2}[k_l] \end{bmatrix} \quad (35)$$

The position of the source can be estimated with weighted least squares (WLS) as follows:

$$\hat{z}_f[k_l] = \left( (\hat{\underline{G}}_f[k_l])^T \underline{W}_f[k]\hat{\underline{G}}_f[k_l] \right)^{-1} (\hat{\underline{G}}_f[k_l])^T \underline{W}_f[k]\hat{h}_f[k_l] \quad (36)$$

$$\underline{W}_f[k] = \begin{bmatrix} \underline{W}_{i_1}[k] & \underline{0}_{6,4} & \underline{0}_{6,2} & \underline{0}_{6,6} \\ \underline{0}_{4,6} & \underline{W}_{i_2}[k] & \underline{0}_{4,2} & \underline{0}_{4,6} \\ \underline{0}_{2,6} & \underline{0}_{2,4} & \underline{W}_{i_3}[k] & \underline{0}_{2,6} \\ \underline{0}_{6,6} & \underline{0}_{6,4} & \underline{0}_{6,2} & \underline{W}_{i_4}[k] \end{bmatrix} \quad (37)$$

where $\underline{W}_f[k]$ is the weight matrix of the error and the matrices $\underline{W}_{i_1}[k]$, $\underline{W}_{i_2}[k]$, $\underline{W}_{i_3}[k]$, $\underline{W}_{i_4}[k]$ are the matrices for weighting the vectors of error values $\underline{\epsilon}_{i_1}[k]$, $\underline{\epsilon}_{i_2}[k]$, $\underline{\epsilon}_{i_3}[k_l]$ and $\underline{\epsilon}_{i_4}[k_l]$ respectively and the matrix $\underline{0}_{M,N}$ is a matrix of zeros of size M×N.
where $$\underline{W}_{i_1}[k] = \begin{bmatrix} \rho^{s_1} & 0 & 0 & 0 & 0 & 0 \\ 0 & \rho^{s_1} & 0 & 0 & 0 & 0 \\ 0 & 0 & \rho^{s_1} & 0 & 0 & 0 \\ 0 & 0 & 0 & \rho^{s_2} & 0 & 0 \\ 0 & 0 & 0 & 0 & \rho^{s_2} & 0 \\ 0 & 0 & 0 & 0 & 0 & \rho^{s_2} \end{bmatrix} \quad (38)$$

$$\underline{W}_{i_2}[k] = \zeta I_4 \quad (39)$$

$$\underline{W}_{i_3}[k] = \eta I_2 \quad (40)$$

$$\underline{W}_{i_4}[k] = \gamma I_6 \quad (41)$$

Where $\zeta$, $\eta$, $\gamma$, $\rho^{s_1}$ and $\rho^{s_2}$ are constants determined experimentally.

Figure 11:
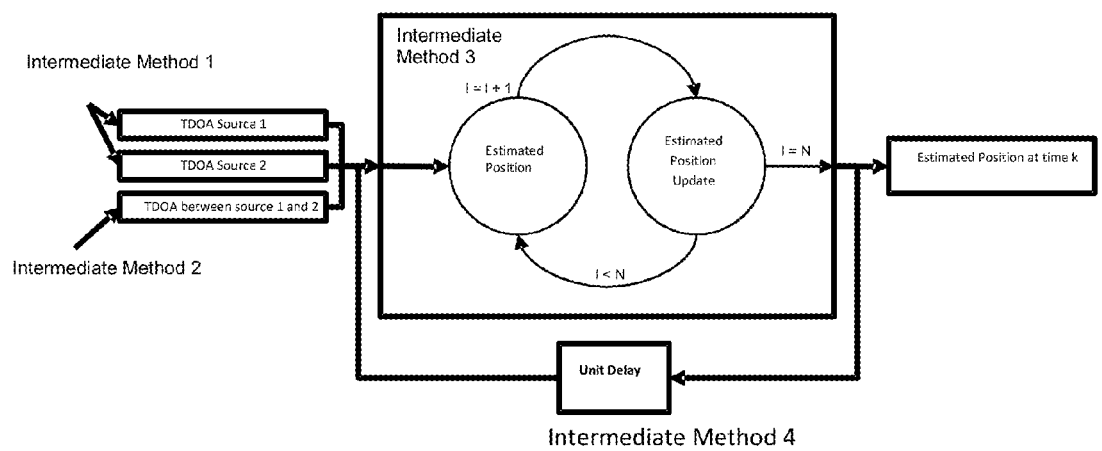
FIG. 11 is a schematic diagram of the methodology for determining the position of the sources using TDOA algorithms in accordance with an aspect of the present invention.

FIG. 11 is a schematic diagram of the methodology for determining the position of the sources in accordance with an aspect of the present invention. For each point in time k, the estimation method performs N iterations on the TDOA measurements. The estimation method is iterative because, as shown in FIG. 11, the intermediate method 3 is an iterative method. At the intermediate method 3, the position predicted at k is the position at a point in time of k−1 because the intermediate method 4 uses the estimated position of the sources from the preceding point in time. The intermediate method 1 uses the TDOA measurements for sources 1 and 2 and the intermediate method 2 uses the difference in the time of arrival of the signals coming from sources 1 and 2 as compared to the various sensors.

Figure 12:
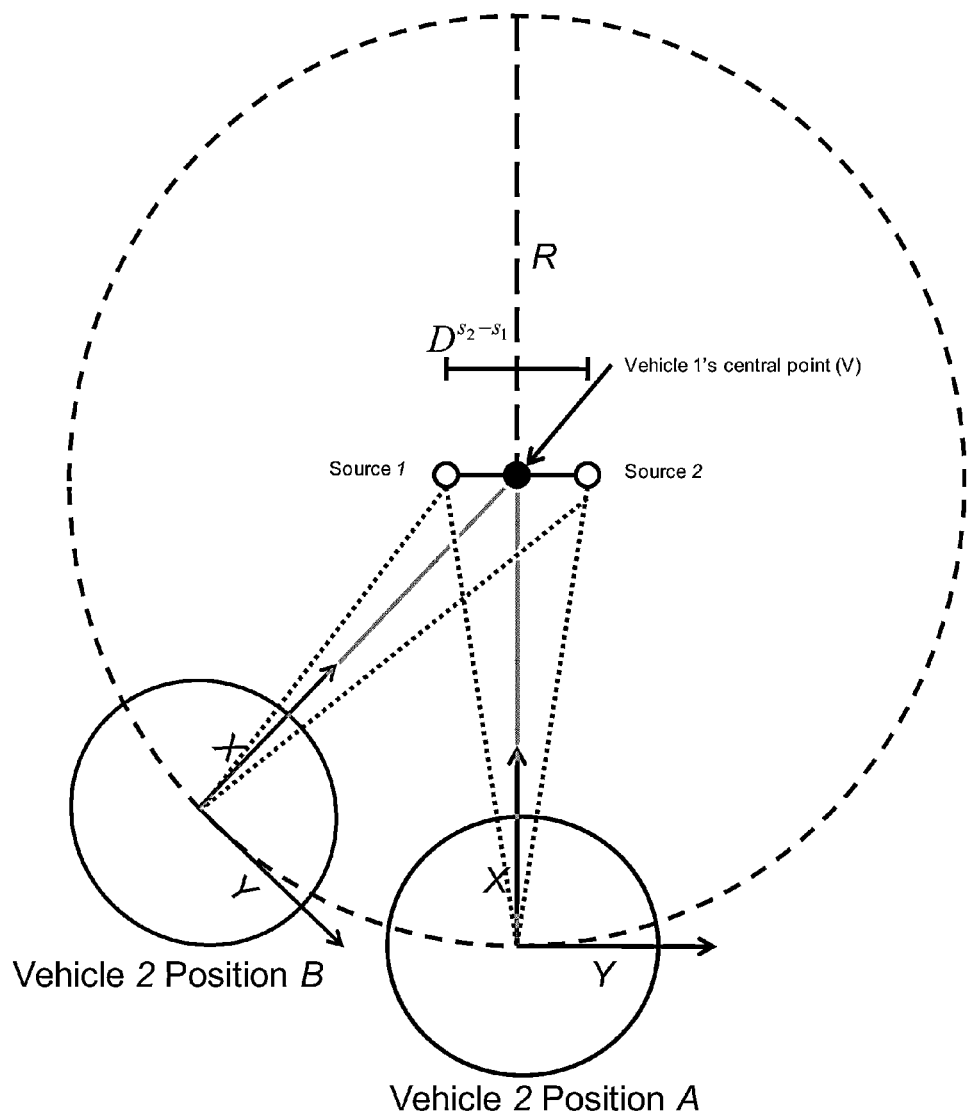
FIG. 12 is a geometrical representation showing that whether a second vehicle is located at position A or at position B, the central point V is visible to vehicle 2 at the same position, but the distance between the vehicle 2 and both sources differs in accordance with an aspect of the present invention.

The relative orientation is determined as the angle between the coordinates of the master vehicle and that of the follower vehicle (see FIG. 2). As shown in FIG. 12, whether vehicle 2 is located at position A or at position B, the central point V is visible to vehicle 2 at the same position of X=R and Y=0. However, the relative orientation differs. Vehicle 2 can estimate the relative orientation to vehicle 1 based on the difference in distance between the two sources on vehicle 1 compared to the ultrasonic sensors on vehicle 2.

Figure 13:
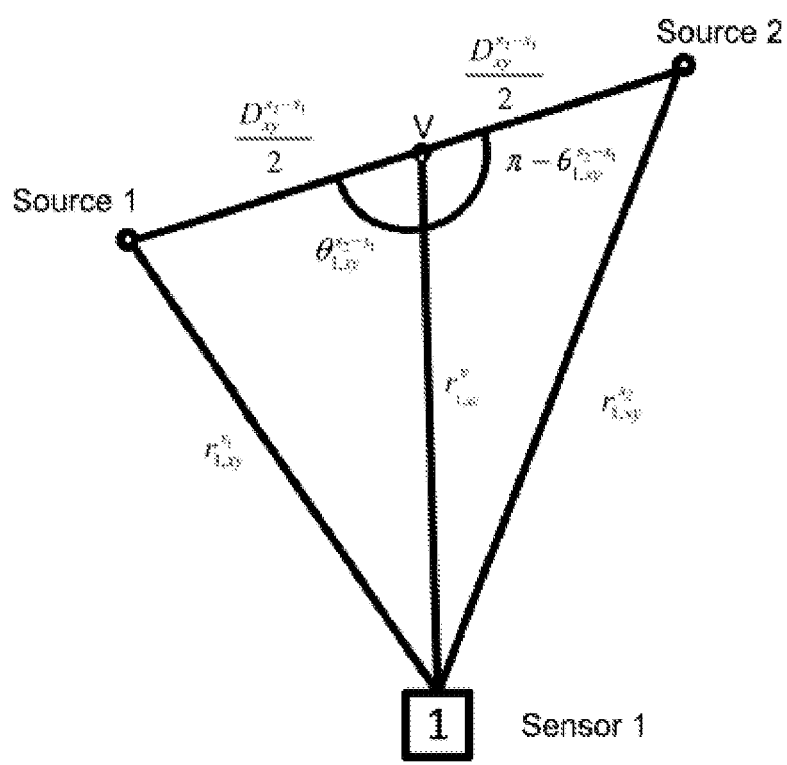
FIG. 13 is a geometrical representation of a triangle formed by joining lines between sources 1 and 2 and sensor 1 as projected on the x-y plane in accordance with an aspect of the present invention.

With regard to determining the relative orientation, the relative orientation of the vehicle to the system of axis must be known. More precisely, this angle must be in the horizontal plane x-y. FIG. 13 is a geometrical representation of a triangle formed by joining lines between sources 1 and 2 and sensor 1 as projected on plane x-y. The distance between the two sources as projected on the horizontal plane is noted as $D_{xy}^{s_2-s_1}$. The distance between source 1 and sensor 1 as projected on the horizontal plane is noted as $r_{1,xy}^{s_1}$. The distance between source 2 and sensor 1 as projected on the horizontal plane is noted as $r_{1,xy}^{s_2}$. The point V is the central point between source 1 and source 2. The angle $\theta_{1,xy}^{s_2-s_1}$ is the angle between the segment uniting sensor 1 and the point V and the segment uniting the point V and source 1.

The coordinates of the point V are calculated based on the following equation:

$$\begin{bmatrix} x^v \\ y^v \\ z^v \end{bmatrix} = \frac{1}{2}\left( \begin{bmatrix} x^{s_1} \\ y^{s_1} \\ z^{s_1} \end{bmatrix} + \begin{bmatrix} x^{s_2} \\ y^{s_2} \\ z^{s_2} \end{bmatrix} \right) \quad (42)$$

To calculate the angle, the law of cosines is applied to the triangle formed by the segments $r_{1,xy}^{s_1}$, $r_{1,xy}^{s_2}$ and $D_{xy}^{s_2-s_1}$:

$$\theta_{1,xy}^{s_2-s_1} = \arccos\left( \frac{(r_{1,xy}^v)^2 + \left(\frac{D_{xy}^{s_2-s_1}}{2}\right)^2 - (r_{1,xy}^{s_1})^2}{r_{1,xy}^v D_{xy}^{s_2-s_1}} \right) \quad (43)$$

The values $r_{1,xy}^{s_1}$, $r_{1,xy}^{s_2}$ and $r_{1,xy}^v$ are calculated as follows:

$$\begin{bmatrix} r_{1,xy}^{s_1} \\ r_{1,xy}^{s_2} \\ r_{1,xy}^v \end{bmatrix} = \begin{bmatrix} \sqrt{(x^{s_1})^2 + (y^{s_1})^2} \\ \sqrt{(x^{s_2})^2 + (y^{s_2})^2} \\ \sqrt{(x^v)^2 + (y^v)^2} \end{bmatrix} \quad (44)$$

The equation (44) provides required variables in order to estimate the angle $\theta_{1,xy}^{s_2-s_1}$ between the axis connecting the two sources and the segment connecting sensor 1 and the point V projected on the x-y plane.

Figure 14:
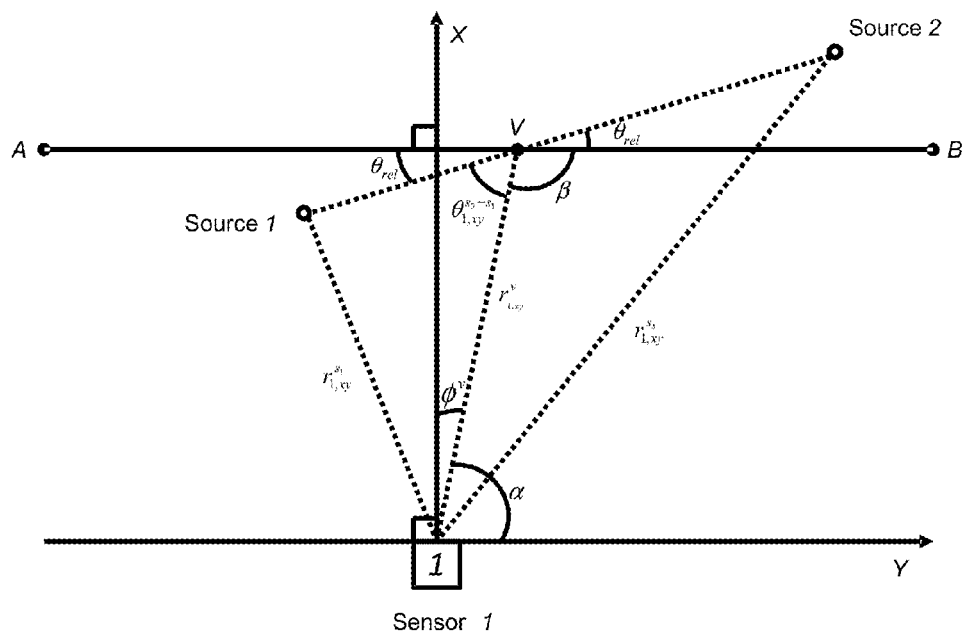
FIG. 14 is a geometrical representation of a triangle formed by connecting the segments between source 1, source 2 and sensor 1 in order to represent the relative heading calculation in accordance with an aspect of the present invention.

FIG. 14 is illustrates how to calculate the relative orientation $\theta_{rel}$. FIG. 14 is a geometrical representation of a triangle formed by connecting the segments between source 1, source 2 and sensor 1. It should be noted that sensor 1 is located at x=0 and y=0 in the x-y plane. The angle $\theta_{1,xy}^{s_2-s_1}$ is calculated based on equation (43) and the angle $\phi^v$ is calculated using the following equation:

$$\phi^v = \arctan\left(\frac{y^v}{x^v}\right) \quad (45)$$

In FIG. 14, the segment AB is parallel to the axis y and passes through the point V. It should also be noted here that it is possible to determine $\theta_{rel}$ with only $\theta_{1,xy}^{s2-s1}$ and $\phi^v$ based on determining the intermediate angles $\alpha$ and $\beta$ as follows:

$$\alpha = \frac{\pi}{2} - \phi^v \quad (46)$$

$$\beta = \pi - \alpha \quad (47)$$

$$\theta_{rel} = \pi - (\theta_{1,xy}^{s2-s1} + \beta) \quad (48)$$

By substituting the equation (46) into the equation (47) and the equation (47) into the equation (48), the relative orientation based on $\phi^v$ and $\theta_{1,xy}^{s2-s1}$ is determined as follows:

$$\theta_{rel} = \frac{\pi}{2} - \theta_{1,xy}^{s2-s1} - \phi^v \quad (49)$$

The accuracy of the present invention depends on the geometric formation of the ultrasonic sensors. As the distance between the ultrasonic sensors on a vehicle increases, the accuracy of the location detection increases. However, for unmanned vehicles, the distance between the ultrasonic sensors on the same vehicle is limited.

According to another aspect of the present invention, RF synchronization can be added to increase the precision of the present invention. Indeed, by calculating the RTT, it is possible to estimate the distance between sources and ultrasonic sensors using at least one ultrasonic source and one ultrasonic sensor. The precision on the distance does not depend on the sensor geometry.

Utilizing RF synchronization also increases the maximum distance between sources and sensors without needing to increase the distance between sensors. The maximum distance is only limited by the ultrasonic and the RF transmitted power.

The RTT is given by the following equation:

$$RTT = T^l + T^s \quad (50)$$

Where $T^l$ and $T^s$ are the propagation delay of the RF wave and the ultrasonic wave respectively.

$T^l$ and $T^s$ can be calculated by following equations $$T^l = \frac{r_1^{sh}}{c_l} \quad (51)$$

$$T^s = \frac{r_1^{sh}}{c_s} \quad (52)$$

Where $c_l = 3 \times 10^8$ m/s the speed of light in the air and $c_s = 343$ m/s and is the speed of sound in the air at ambient normal conditions.

By replacing equations (51) and (52) in the equation (50) and isolating $r_1^{sh}$:

$$r_1^{sh} = \frac{RTT_1^{sh} c_l c_s}{c_l + c_s} \approx \frac{RTT_1^{sh}}{c_s} \quad (53)$$

Another intermediate method is introduced here to include the distance between the sensor 1 and the source h in the equation system:

$$\underline{\varepsilon}_{i_5}[k] = \hat{\underline{G}}_{i_5} \hat{\underline{z}}_{i_5}[k] + \hat{\underline{h}}_{i_5}[k] \quad (54)$$

where:

$$\underline{G}_{i_5} = [0 \ 0 \ 1 \ 0 \ 0 \ 0] \quad (55)$$

$$\hat{\underline{h}}_{i_5}[k] = -\left[\frac{RTT_1^{sh}[k]}{c_s}\right] \quad (56)$$

$$\hat{\underline{z}}_{i_5}[k] = \begin{bmatrix} \hat{y}^{s1}[k] \\ \hat{z}^{s1}[k] \\ \hat{r}_1^{s1}[k] \\ \hat{y}^{s2}[k] \\ \hat{z}^{s2}[k] \\ \hat{r}_1^{s2}[k] \end{bmatrix} \quad (57)$$

$$\underline{W}_{i_5}[k] = v \quad (58)$$

The intermediate method 5 can now be merged with the method f:

$$\hat{\underline{G}}_f^{RF}[k_l] = \begin{bmatrix} \hat{\underline{G}}_{i_1}[k] \\ \hat{\underline{G}}_{i_2}[k] \\ \hat{\underline{G}}_{i_3}[k_l] \\ \underline{G}_{i_4} \\ \underline{G}_{i_5}[k] \end{bmatrix} \quad (59)$$

$$\hat{\underline{h}}_f^{RF}[k_l] = -\begin{bmatrix} \hat{h}_{i_1}[k] \\ \hat{h}_{i_2}[k] \\ \hat{h}_{i_3}[k_l] \\ \hat{h}_{i_4}[k_l] \\ \hat{h}_{i_5}[k] \end{bmatrix} \quad (60)$$

$$\hat{\underline{z}}_f^{RF}[k_l] = \begin{bmatrix} \hat{y}^{s1}[k_l] \\ \hat{z}^{s1}[k_l] \\ \hat{r}_1^{s1}[k_l] \\ \hat{y}^{s2}[k_l] \\ \hat{z}^{s2}[k_l] \\ \hat{r}_1^{s2}[k_l] \end{bmatrix} \quad (61)$$

The position of the source can be estimated with weighted least squares (WLS):

$$\hat{z}_f^{RF}[k_l] = \left(\left(\hat{\underline{G}}_f^{RF}[k_l]\right)^T \underline{W}_f^{RF}[k]\hat{\underline{G}}_f^{RF}[k_l]\right)^{-1} \left(\hat{\underline{G}}_f^{RF}[k_l]\right)^T \underline{W}_f^{RF}[k]\hat{\underline{h}}_f^{RF}[k_l] \quad (62)$$

and $$\begin{bmatrix} \underline{W}_{i_1}[k] & \underline{0}_{6,4} & \underline{0}_{6,2} & \underline{0}_{6,6} & \underline{0}_{6,1} \\ \underline{0}_{4,6} & \underline{W}_{i_2}[k] & \underline{0}_{4,2} & \underline{0}_{4,6} & \underline{0}_{4,1} \\ \underline{0}_{2,6} & \underline{0}_{2,4} & \underline{W}_{i_3}[k] & \underline{0}_{2,6} & \underline{0}_{2,1} \\ \underline{0}_{6,6} & \underline{0}_{6,4} & \underline{0}_{6,2} & \underline{W}_{i_4}[k] & \underline{0}_{6,1} \\ \underline{0}_{1,6} & \underline{0}_{1,4} & \underline{0}_{1,2} & \underline{0}_{1,6} & \underline{W}_{i_5}[k] \end{bmatrix} \quad (63)$$

The additional aspect of RF synchronization provides several advantages:
Broader choice of array structure:
  Removing constraint on the array's geometry;
  Removing the correlation between the array's geometry and the precision on the distance measurement;
The array structure can be reduced in size:
  Reducing the array's weight;
  Reducing non-linearity on position measures by reducing sensors location uncertainties;
Increasing the precision on the measure of the distance of sources, which will increase the precision of measures on the X, Y and Z axis;
The maximal distance is limited only by the transmission power of ultrasonic sources;
Eliminate ambiguous zones;
Reduce the minimal number of ultrasonic sensors to 3 instead of 4; and
Add redundancy to the system.

Figure 15:
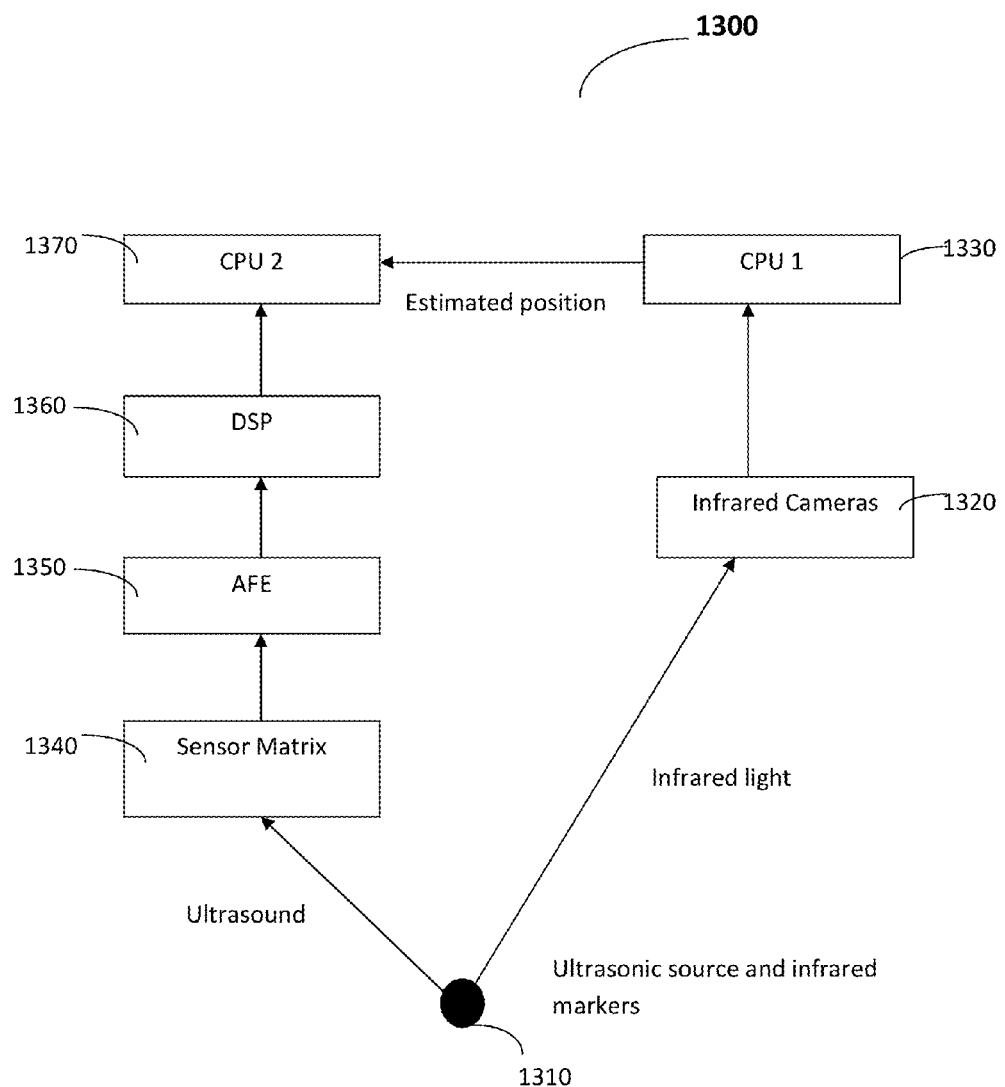
FIG. 15 is a block diagram of an experimental set-up in accordance with an infrared localization system for results validation in accordance with an aspect of the present invention.

FIGS. 15 through 19 show an experimental set-up in accordance with the present invention. FIG. 15 is a block diagram of an experimental set-up 1300 utilizing infra-red cameras system for validation purposes. The experimental set-up 1300 shows an ultrasonic source and infrared markers 1310 that would be located on a first vehicle (not shown). The ultrasonic sensor sends ultrasound waves for receipt by the matrix of sensors 1340 on a second vehicle (not shown). The sensors 1340 send the signals received to the AFE 1350 for signal conversion. The AFE 1350 then sends the converted signals to the DSP 1360 for signal processing. The DSP is operatively coupled to a central processing unit (CPU) 2 1370 for determining the relative position and orientation of the second vehicle relative to the first vehicle.

The infrared markers reflect back infrared light from the infrared cameras 1320 mounted on the walls. The infrared cameras 1320 are operatively coupled to CPU 1 1330 to process the recorded infrared signals in order to determine the location of the second vehicle relative to the first vehicle. Both the CPU 1 (1330) and the infrared cameras (1320) provide means of validation and are further embodiments of the present invention.

Figure 16:
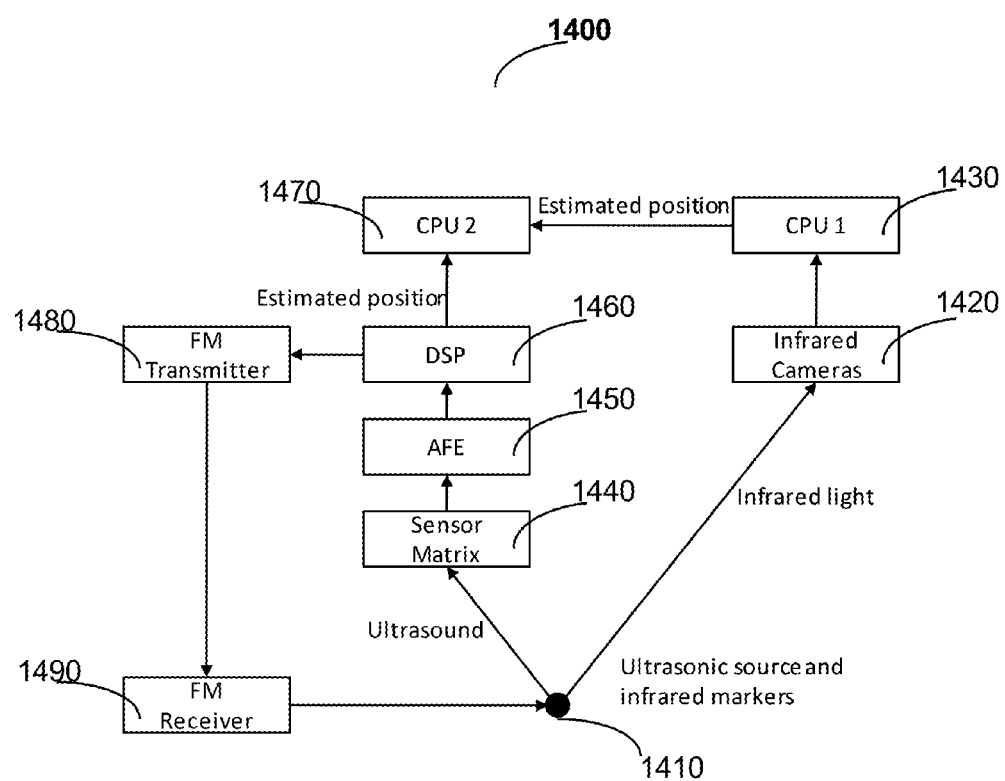
FIG. 16 is a block diagram of an experimental set-up in accordance with an extra RF synchronization sub-system and an infrared localization system for results validation.

FIG. 16 is a block diagram of an experimental set-up 1400 utilizing infra-red cameras system for validation purposes. The experimental set-up 1400 shows an ultrasonic source and infrared markers 1420 that would be located on a first vehicle (not shown). The ultrasonic sensor sends ultrasound waves received by the matrix of sensors 1440 on a second vehicle (not shown). The sensors 1440 send the signals received to the AFE 1450 for signal conversion. The AFE 1450 then sends the converted signals to the DSP 1460 for signal processing. The DSP is operatively coupled to a CPU 2 (central processing unit) 2 1470 for determining the relative position and orientation of the second vehicle relative to the first vehicle. The DSP 1460 is operatively coupled to the FM Transmitter 1480 which sends and RF synchronization signal to the FM receiver 1490. The FM receiver 1490 is operatively coupled to the ultrasonic source 1410. The ultrasonic source 1410 sends ultrasonic pulses when the RF synchronization signal received from 1490 rises (from logic low to logic high).

The infrared markers reflect back infrared light from the infrared cameras 1420 mounted on the walls. The infrared cameras 1420 are operatively coupled to CPU 1 1430 to process the recorded infrared signals in order to determine the location of the second vehicle relative to the first vehicle. Both the CPU 1 (1430) and the infrared cameras (1420) provide means of validation and are further embodiments of the present invention.

Although two CPUs are shown, the present invention only requires one CPU for TDOA algorithms and formation controllers. This CPU can be a desktop computer (used as a base station) or an embedded computer located on board unmanned vehicles. Alternatively, the CPU 1 is not required since it serves only for validation means. A single CPU may be used in accordance with an aspect of the present invention.

In experiments, a mobile robot was equipped with two ultrasonic sources operating to 32.8 KHz and 25 KHz, respectively. The two sources were at a distance of 0.28 m from one another. An aerial vehicle (of quad rotor type) was equipped with four ultrasonic sensors with the following configuration:

$$\begin{bmatrix} x_1 & x_2 & x_3 & x_4 \\ y_1 & y_2 & y_3 & y_4 \\ z_1 & z_2 & z_3 & z_4 \end{bmatrix} = \begin{bmatrix} 0 & 0 & 0 & 0 \\ 0 & 0.0042 & 0.3937 & -0.4318 \\ 0 & 0.326 & 0 & 0 \end{bmatrix} \quad (64)$$

Where $x_i$, $y_i$ and $z_i$ represent the position of sensor i in the Cartesian frame of reference. The air vehicle tried to follow the mobile robot to a distance of 1 m, by using only the relative positioning system in this particular embodiment of the present invention. Here, the commercial system of localization by infra-red cameras recorded positions for offline validation purposes.

Since the air vehicles used had limited payload capacities, only the ultrasonic sensors and their infrastructure were installed on board the vehicles. The AFE and the DSP were installed on a table. Long wires were connected to the sensors and the AFE.

The following materials were used to carry out the experimentation:
Two ultrasonic sources (32.8 KHz and 25 KHz);
A sound wave generation circuit customized for this experiment;
Four ultrasonic sensors SPM404UD5 by Knowles Acoustics™;
A mechanical stand for the sensors made of balsa;
An analog front end board (simultaneous analog to digital converter and programmable gain amplifiers), AFE-5851 by Texas Instruments™;
A digital signal processor, Blackfin-537 by Analog Devices™;
An interface board for electric level conversion, customized for the experiment;

Measurement and testing equipment (Computer QuaRC: for the data back-up and TDOA localization algorithms, and an infrared tracking system (OptiTrack): for localization validation);

Unmanned vehicles;

One COTS (Commercial Over The Shelf) FM transmitter; and

One COTS FM receiver.

It is readily understood by the skilled artisan that various configurations and materials may have been used in experimentation. The above materials were chosen based on what was readily available to the researchers at the time the experiments were developed, and not based on what is readily available in the marketplace.

Figure 17:
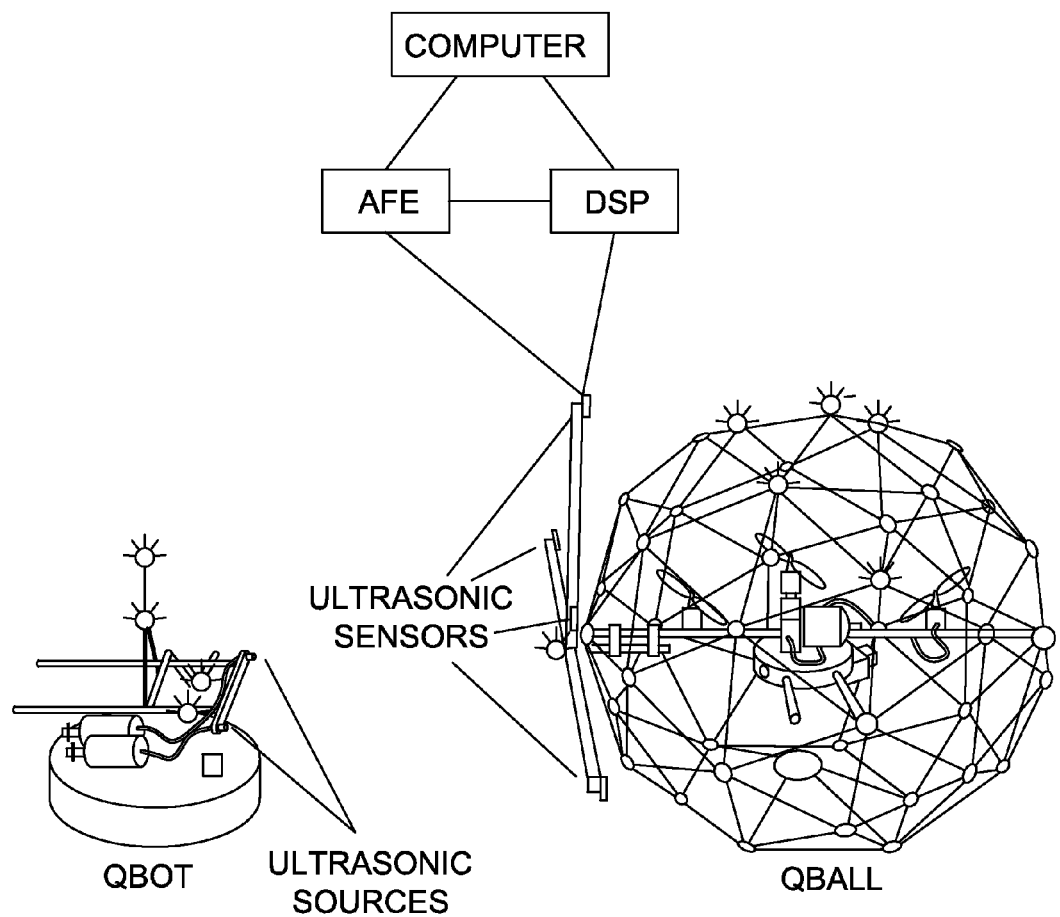
FIGS. 17 and 18 show the unmanned vehicles, as well as the ultrasonic sources and sensors and the infra-red reflecting markers used in the experiment in accordance with the present invention.
Figure 18:
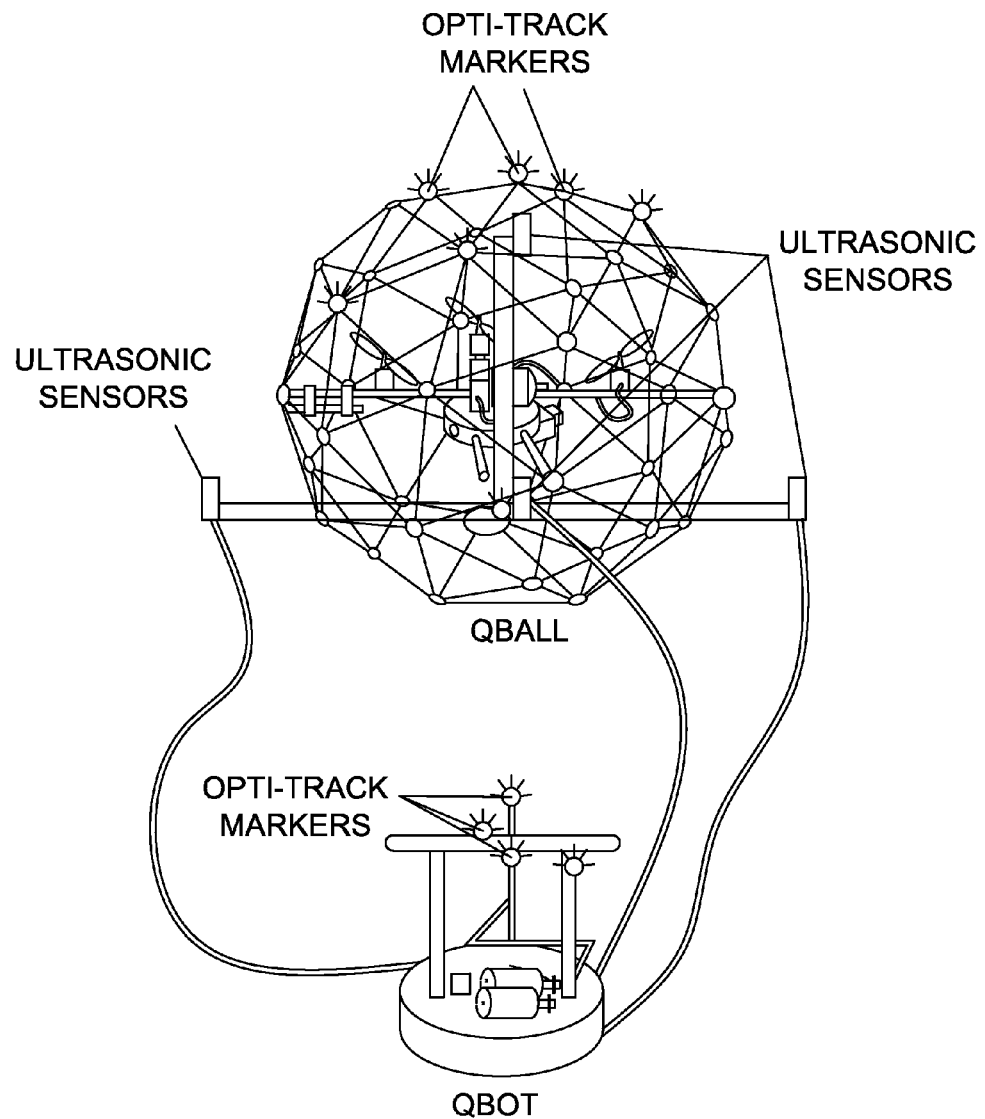

FIGS. 17 and 18 show the unmanned vehicles, as well as the ultrasonic sources and sensors and the infrared reflecting balls.

Figure 19:
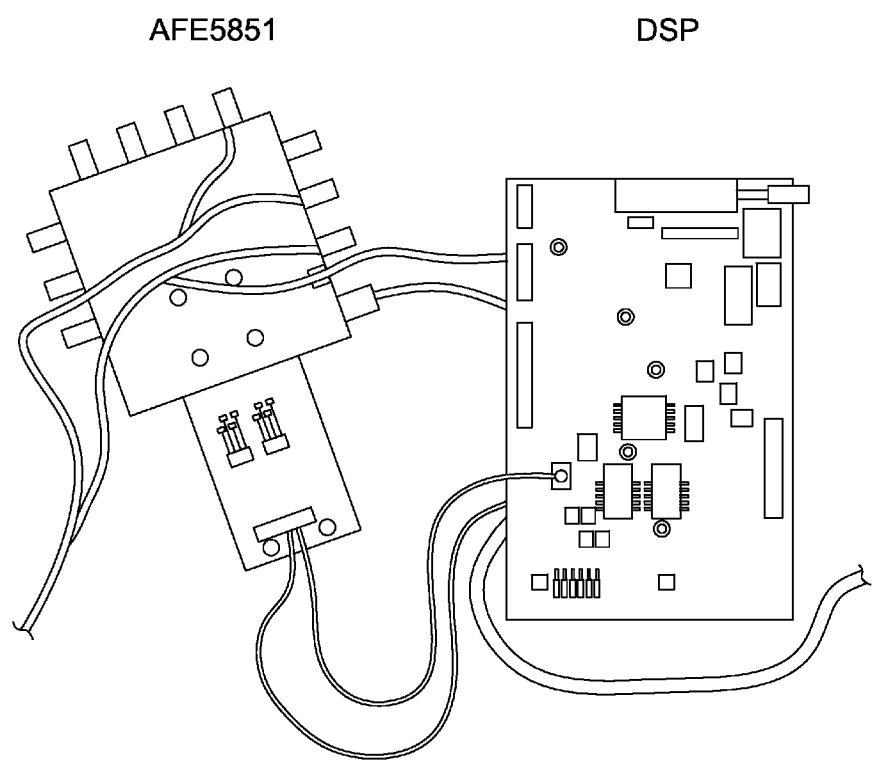
FIG. 19 shows a DSP and an AFE used in the experiment in accordance with the present invention.

FIG. 19 shows a DSP and an AFE used in the experiment.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object oriented language (e.g."C++"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for locating a first vehicle relative to a second vehicle comprising:
   at least one source, operatively coupled to the first vehicle, for transmitting a signal;
   at least four sensors, operatively coupled to the second vehicle, for receiving the signal; and
   signal processing means, operatively coupled to the second vehicle, for processing the signal received by each of the at least four sensors to determine the relative location of the second vehicle to the first vehicle based on differences in time of arrival of the same signal by each of the at least four sensors;
   wherein the first vehicle and the second vehicle are both unmanned;
   wherein the time of arrival of the signal at each of the at least four sensors corresponds to an initial detection of a sinusoidal wave at each of the at least four sensors;
   wherein the system determines the time of arrival of the signal from a series of samples taken along a period of time when the sinusoidal wave is at its peak, the time of arrival being determined to be when a first peak of the sinusoidal wave within the series of samples is detected;
   wherein the peak of the sinusoidal wave occurs when a power of the signal is at a maximum level; and
   wherein the relative location is validated by an infrared tracking means that includes at least one infrared camera that is in operative communication with at least one infrared marker operatively coupled to the first vehicle.

2. The system as in claim 1, wherein the at least one source is two sources, wherein each source transmits a unique signal that is received by the at least four sensors.

3. The system as in claim 2, wherein the signal processing means determines the relative orientation of the second vehicle to the first vehicle based on the difference in distance between the two sources compared to any two of the at least four sensors.

4. The system as in claim 2, wherein the signal processing means includes a band pass filter for processing the signals received by the at least four sensors into independent signals.

5. The system as in claim 1, wherein each sensor of the at least four sensors receives the signal from the at least one source.

6. The system as in claim 1, wherein the at least one source is an ultrasonic source for transmitting sound waves.

7. The system as in claim 1, wherein each of the at least four sensors is an ultrasonic sensor for receiving sound waves.

8. The system as in claim 1, wherein at least one of the first vehicle and the second vehicle is an aerial vehicle.

9. A method for locating a first vehicle relative to a second vehicle comprising steps of:
   (a) transmitting, by a digital signal transmitter, a signal from a source operatively coupled to the first vehicle;

(b) receiving the signal by at least four sensors operatively coupled to the second vehicle;

(c) processing, by a processor, the signal received by each of the at least four sensors;

(d) determining, by the processor, the relative location of the second vehicle to the first vehicle based on differences in time of arrival of the signal by each of the at least four sensors; and (e) validating the relative location through an infrared tracking means that includes at least one infrared camera that is in operative communication with at least one infrared marker operatively coupled to the first vehicle;

wherein the first vehicle and the second vehicle are both unmanned;

wherein the source emits a sinusoidal wave intermittently;

wherein the time of arrival of the signal at each of the at least four sensors corresponds to an initial detection of the sinusoidal wave at each of the at least four sensors;

wherein a series of samples is taken along a period of time when the sinusoidal wave is at its peak so as to determine the time of arrival of the signal, the time of arrival being determined to be when a first peak of the sinusoidal wave within the series of samples is detected; and wherein the peak of the sinusoidal wave occurs when a power of the signal is at a maximum level.

10. The method as in claim 9, wherein steps (a) through (d) are performed continuously to maintain a specific distance between the first vehicle and the second vehicle as the vehicles move position.

11. The method as in claim 9, wherein two unique signals are transmitted by two sources on the first vehicle for receipt by each of the at least four sensors.

12. The method as in claim 11, wherein step (d) determines the relative orientation of the second vehicle to the first vehicle based on the difference in distance between the two sources compared to one of the at least four sensors.

13. The method as in claim 12, wherein steps (a) through (d) are performed continuously to maintain a specific distance and orientation between the first vehicle and the second vehicle as at least one of the vehicles move position.

14. A system for locating a first vehicle relative to a second vehicle comprising:

at least one source, operatively coupled to the first vehicle, for transmitting a signal;

at least four sensors, operatively coupled to the second vehicle, for receiving the signal; and signal processing means, operatively coupled to the second vehicle, for processing the signal received by each of the at least four sensors to determine the relative location of the second vehicle to the first vehicle based on differences in time of arrival of the same signal by each of the at least four sensors;

wherein the first vehicle and the second vehicle are both unmanned;

wherein the time of arrival of the si nal at each of the at least four sensors corresponds to an initial detection of a sinusoidal wave at each of the at least four sensors;

wherein the system determines the time of arrival of the signal from a series of samples taken along a period of time when the sinusoidal wave is at its peak, the time of arrival being determined to be when a first peak of the sinusoidal wave within the series of samples is detected;

wherein the peak of the sinusoidal wave occurs when a power of the signal is at a maximum level;

wherein the relative location is validated by an infrared tracking means that includes at least one infrared camera that is in operative communication with at least one infrared marker operatively coupled to the first vehicle; and wherein at least one of the first vehicle and the second vehicle is an aerial vehicle.

* * * * *